(12) United States Patent
Von der Emde et al.

(10) Patent No.: US 8,671,032 B2
(45) Date of Patent: Mar. 11, 2014

(54) PROVIDING PAYMENT SOFTWARE APPLICATION AS ENTERPRISE SERVICES

(75) Inventors: Martin Von der Emde, Wiesloch (DE); Thomas Hoffmann, Roemerberg (DE); Dietmar Nowotny, Dielheim (DE); Jan Penning, Heidelberg (DE)

(73) Assignee: SAP AG, Walldorf (DE)

(*) Notice: Subject to any disclaimer, the term of this patent is extended or adjusted under 35 U.S.C. 154(b) by 1059 days.

(21) Appl. No.: 11/967,865

(22) Filed: Dec. 31, 2007

(65) Prior Publication Data

US 2009/0171819 A1 Jul. 2, 2009

(51) Int. Cl.
*G07F 17/22* (2006.01)
*G06F 17/22* (2006.01)
*G06Q 40/00* (2006.01)

(52) U.S. Cl.
USPC .................... 705/30; 705/31; 705/40

(58) Field of Classification Search
USPC .......................................... 705/30
See application file for complete search history.

(56) References Cited

U.S. PATENT DOCUMENTS

| | | | |
|---|---|---|---|
| 4,947,321 A | 8/1990 | Spence et al. | |
| 5,550,734 A | 8/1996 | Tarter et al. | |
| 5,560,005 A | 9/1996 | Hoover et al. | |
| 5,586,312 A | 12/1996 | Johnson et al. | |
| 5,632,022 A | 5/1997 | Warren et al. | |
| 5,634,127 A | 5/1997 | Cloud et al. | |
| 5,680,619 A | 10/1997 | Gudmundson et al. | |
| 5,704,044 A | 12/1997 | Tarter et al. | |
| 5,768,119 A | 6/1998 | Havekost et al. | |
| 5,822,585 A | 10/1998 | Noble et al. | |
| 5,832,218 A | 11/1998 | Gibbs et al. | |
| 5,848,291 A | 12/1998 | Milne et al. | |
| 5,867,495 A | 2/1999 | Elliott et al. | |
| 5,881,230 A | 3/1999 | Christensen et al. | |
| 5,893,106 A | 4/1999 | Brobst et al. | |
| 5,918,219 A | 6/1999 | Isherwood | |
| 5,987,247 A | 11/1999 | Lau | |
| H001830 H * | 1/2000 | Petrimoulx et al. | 705/31 |
| 6,028,997 A | 2/2000 | Leymann et al. | |
| 6,049,838 A | 4/2000 | Miller et al. | |
| 6,070,197 A | 5/2000 | Cobb et al. | |
| 6,151,582 A | 11/2000 | Huang et al. | |
| 6,167,563 A | 12/2000 | Fontana et al. | |

(Continued)

FOREIGN PATENT DOCUMENTS

| | | |
|---|---|---|
| WO | 00/23874 | 4/2000 |
| WO | 2004/083984 | 9/2004 |
| WO | 2005/114381 | 12/2005 |

OTHER PUBLICATIONS

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

(Continued)

*Primary Examiner* — Matthew S Gart
*Assistant Examiner* — Ashford Hayles
(74) *Attorney, Agent, or Firm* — Fish & Richardson P.C.

(57) ABSTRACT

Methods and apparatus, including systems and computer program products, for a service architecture design that provides enterprise services having payment functionality at the level of an enterprise application. The design includes a set of service operations, process components, and optionally deployment units. Suitable business objects are also described.

23 Claims, 18 Drawing Sheets

(56) References Cited

U.S. PATENT DOCUMENTS

| | | | |
|---|---|---|---|
| 6,167,564 A | 12/2000 | Fontana et al. | |
| 6,177,932 B1 | 1/2001 | Galdes et al. | |
| 6,182,133 B1 | 1/2001 | Horvitz | |
| 6,208,345 B1 | 3/2001 | Sheard et al. | |
| 6,272,672 B1 | 8/2001 | Conway | |
| 6,311,170 B1 * | 10/2001 | Embrey | 705/40 |
| 6,338,097 B1 | 1/2002 | Krenzke et al. | |
| 6,424,991 B1 | 7/2002 | Gish | |
| 6,434,740 B1 | 8/2002 | Monday et al. | |
| 6,442,748 B1 | 8/2002 | Bowman-Amuah | |
| 6,445,782 B1 | 9/2002 | Elfe et al. | |
| 6,446,045 B1 | 9/2002 | Stone et al. | |
| 6,446,092 B1 | 9/2002 | Sutter | |
| 6,473,794 B1 | 10/2002 | Guheen et al. | |
| 6,493,716 B1 | 12/2002 | Azagury et al. | |
| 6,571,220 B1 | 5/2003 | Ogino et al. | |
| 6,594,535 B1 | 7/2003 | Costanza | |
| 6,601,233 B1 | 7/2003 | Underwood | |
| 6,601,234 B1 | 7/2003 | Bowman-Amuah | |
| 6,606,744 B1 | 8/2003 | Mikurak | |
| 6,609,100 B2 | 8/2003 | Smith et al. | |
| 6,671,673 B1 | 12/2003 | Baseman et al. | |
| 6,678,882 B1 | 1/2004 | Hurley et al. | |
| 6,687,734 B1 | 2/2004 | Sellink et al. | |
| 6,691,151 B1 | 2/2004 | Cheyer et al. | |
| 6,721,783 B1 | 4/2004 | Blossman et al. | |
| 6,738,964 B1 | 5/2004 | Zink et al. | |
| 6,747,679 B1 | 6/2004 | Finch et al. | |
| 6,750,885 B1 | 6/2004 | Finch et al. | |
| 6,764,009 B2 | 7/2004 | Melick et al. | |
| 6,789,252 B1 | 9/2004 | Burke et al. | |
| 6,847,854 B2 | 1/2005 | Discenzo | |
| 6,859,931 B1 | 2/2005 | Cheyer et al. | |
| 6,889,197 B2 | 5/2005 | Lidow | |
| 6,889,375 B1 | 5/2005 | Chan et al. | |
| 6,895,438 B1 | 5/2005 | Ulrich | |
| 6,904,399 B2 | 6/2005 | Cooper et al. | |
| 6,907,395 B1 | 6/2005 | Hunt et al. | |
| 6,954,736 B2 | 10/2005 | Menninger et al. | |
| 6,985,939 B2 | 1/2006 | Fletcher et al. | |
| 6,990,466 B1 | 1/2006 | Hu | |
| 7,003,474 B2 | 2/2006 | Lidow | |
| 7,031,998 B2 | 4/2006 | Archbold | |
| 7,043,448 B2 * | 5/2006 | Campbell | 705/31 |
| 7,047,518 B2 | 5/2006 | Little et al. | |
| 7,050,056 B2 | 5/2006 | Meyringer | |
| 7,050,873 B1 | 5/2006 | Discenzo | |
| 7,055,136 B2 | 5/2006 | Dzoba et al. | |
| 7,058,587 B1 | 6/2006 | Horne | |
| 7,069,536 B2 | 6/2006 | Yaung | |
| 7,072,855 B1 | 7/2006 | Godlewski et al. | |
| 7,076,766 B2 | 7/2006 | Wirts et al. | |
| 7,117,447 B2 | 10/2006 | Cobb et al. | |
| 7,120,597 B1 * | 10/2006 | Knudtzon et al. | 705/30 |
| 7,120,896 B2 | 10/2006 | Budhiraja et al. | |
| 7,131,069 B1 | 10/2006 | Rush et al. | |
| 7,155,409 B1 * | 12/2006 | Stroh | 705/37 |
| 7,181,694 B2 | 2/2007 | Reiss et al. | |
| 7,184,964 B2 | 2/2007 | Wang | |
| 7,194,431 B1 * | 3/2007 | Land et al. | 705/30 |
| 7,197,740 B2 | 3/2007 | Beringer et al. | |
| 7,200,569 B2 * | 4/2007 | Gallagher et al. | 705/31 |
| 7,206,768 B1 * | 4/2007 | deGroeve et al. | 705/54 |
| 7,216,091 B1 | 5/2007 | Blandina et al. | |
| 7,219,107 B2 | 5/2007 | Beringer | |
| 7,222,786 B2 | 5/2007 | Renz et al. | |
| 7,225,240 B1 | 5/2007 | Fox et al. | |
| 7,257,254 B2 | 8/2007 | Tunney | |
| 7,283,973 B1 | 10/2007 | Loghmani et al. | |
| 7,293,254 B2 | 11/2007 | Bloesch et al. | |
| 7,299,970 B1 * | 11/2007 | Ching | 235/375 |
| 7,315,830 B1 | 1/2008 | Wirtz et al. | |
| 7,324,966 B2 | 1/2008 | Scheer | |
| 7,353,180 B1 | 4/2008 | Silverstone et al. | |
| 7,356,492 B2 | 4/2008 | Hazi et al. | |
| 7,367,011 B2 | 4/2008 | Ramsey et al. | |
| 7,370,315 B1 | 5/2008 | Lovell et al. | |
| 7,376,601 B1 | 5/2008 | Aldridge | |
| 7,376,604 B1 | 5/2008 | Butcher | |
| 7,376,632 B1 | 5/2008 | Sadek et al. | |
| 7,383,201 B2 | 6/2008 | Matsuzaki et al. | |
| 7,386,833 B2 | 6/2008 | Granny et al. | |
| 7,406,716 B2 | 7/2008 | Kanamori et al. | |
| 7,415,697 B1 | 8/2008 | Houlding | |
| 7,418,409 B1 | 8/2008 | Goel | |
| 7,418,424 B2 * | 8/2008 | Martin et al. | 705/37 |
| 7,448,022 B1 | 11/2008 | Ram et al. | |
| 7,451,432 B2 | 11/2008 | Shukla et al. | |
| 7,461,030 B2 | 12/2008 | Hibler et al. | |
| 7,469,233 B2 | 12/2008 | Shooks et al. | |
| 7,516,088 B2 | 4/2009 | Johnson et al. | |
| 7,523,054 B2 | 4/2009 | Tyson-Quah | |
| 7,529,699 B2 | 5/2009 | Fuse et al. | |
| 7,536,325 B2 | 5/2009 | Randell et al. | |
| 7,536,354 B1 * | 5/2009 | deGroeve et al. | 705/54 |
| 7,546,520 B2 | 6/2009 | Davidson et al. | |
| 7,546,575 B1 | 6/2009 | Dillman et al. | |
| 7,565,640 B2 | 7/2009 | Shukla et al. | |
| 7,624,371 B2 | 11/2009 | Kulkarni et al. | |
| 7,631,291 B2 | 12/2009 | Shukla et al. | |
| 7,640,195 B2 * | 12/2009 | Von Zimmermann et al. | 705/30 |
| 7,640,291 B2 | 12/2009 | Maturana et al. | |
| 7,657,406 B2 | 2/2010 | Tolone et al. | |
| 7,657,445 B1 | 2/2010 | Goux | |
| 7,665,083 B2 * | 2/2010 | Demant et al. | 717/173 |
| 7,668,761 B2 | 2/2010 | Jenkins et al. | |
| 7,672,888 B2 | 3/2010 | Allin et al. | |
| 7,681,176 B2 | 3/2010 | Wills et al. | |
| 7,693,586 B2 | 4/2010 | Dumas et al. | |
| 7,703,073 B2 | 4/2010 | Illowsky et al. | |
| 7,739,160 B1 | 6/2010 | Ryan et al. | |
| 7,742,985 B1 | 6/2010 | Digrigoli et al. | |
| 7,747,980 B2 | 6/2010 | Illowsky et al. | |
| 7,765,156 B2 | 7/2010 | Staniar et al. | |
| 7,765,521 B2 | 7/2010 | Bryant | |
| 7,788,145 B2 | 8/2010 | Wadawadigi et al. | |
| 7,797,698 B2 | 9/2010 | Diament et al. | |
| 7,814,142 B2 | 10/2010 | Mamou et al. | |
| 7,822,682 B2 | 10/2010 | Arnold et al. | |
| 7,835,971 B2 | 11/2010 | Stockton et al. | |
| 7,904,350 B2 | 3/2011 | Ayala et al. | |
| 7,925,985 B2 | 4/2011 | Moore | |
| 2002/0026394 A1 * | 2/2002 | Savage et al. | 705/34 |
| 2002/0042756 A1 | 4/2002 | Kumar et al. | |
| 2002/0049622 A1 | 4/2002 | Lettich et al. | |
| 2002/0073114 A1 | 6/2002 | Nicastro et al. | |
| 2002/0078046 A1 | 6/2002 | Uluakar et al. | |
| 2002/0082892 A1 | 6/2002 | Raffel et al. | |
| 2002/0103660 A1 | 8/2002 | Cramon et al. | |
| 2002/0107826 A1 | 8/2002 | Ramachandran et al. | |
| 2002/0120553 A1 | 8/2002 | Bowman-Amuah | |
| 2002/0133368 A1 | 9/2002 | Strutt et al. | |
| 2002/0138281 A1 | 9/2002 | Cirulli et al. | |
| 2002/0138358 A1 | 9/2002 | Scheer | |
| 2002/0143598 A1 | 10/2002 | Scheer | |
| 2002/0156695 A1 | 10/2002 | Edwards | |
| 2002/0161907 A1 | 10/2002 | Moon | |
| 2002/0184111 A1 | 12/2002 | Swanson | |
| 2002/0188486 A1 | 12/2002 | Gil et al. | |
| 2002/0198798 A1 | 12/2002 | Ludwig et al. | |
| 2002/0198828 A1 | 12/2002 | Ludwig et al. | |
| 2003/0009754 A1 | 1/2003 | Rowley et al. | |
| 2003/0069774 A1 | 4/2003 | Hoffman et al. | |
| 2003/0074271 A1 | 4/2003 | Viswanath et al. | |
| 2003/0074360 A1 | 4/2003 | Chen et al. | |
| 2003/0083762 A1 | 5/2003 | Farrah et al. | |
| 2003/0084127 A1 | 5/2003 | Budhiraja et al. | |
| 2003/0130860 A1 | 7/2003 | Datta et al. | |
| 2003/0182206 A1 | 9/2003 | Hendrix et al. | |
| 2003/0212602 A1 | 11/2003 | Schaller | |
| 2003/0233290 A1 | 12/2003 | Yang et al. | |
| 2004/0015367 A1 | 1/2004 | Nicastro et al. | |
| 2004/0034578 A1 | 2/2004 | Oney et al. | |
| 2004/0111304 A1 | 6/2004 | Meka et al. | |

(56) References Cited

U.S. PATENT DOCUMENTS

| | | |
|---|---|---|
| 2004/0128180 A1 | 7/2004 | Abel et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1* | 4/2006 | Seubert et al. ................ 705/40 |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | Von Helmolt et al. |
| 2007/0129985 A1 | 6/2007 | Helmolt et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156430 A1 | 7/2007 | Kaetker et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1* | 9/2007 | Kahlon et al. ................ 705/28 |
| 2007/0220046 A1 | 9/2007 | Moosmann et al. |
| 2007/0233541 A1 | 10/2007 | Schorr et al. |
| 2007/0233575 A1 | 10/2007 | Berger et al. |
| 2007/0234282 A1 | 10/2007 | Prigge et al. |
| 2007/0239508 A1* | 10/2007 | Fazal et al. ................ 705/8 |
| 2007/0239569 A1 | 10/2007 | Lucas et al. |
| 2007/0265862 A1 | 11/2007 | Freund et al. |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1* | 5/2008 | Seubert et al. ................ 705/1 |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2009/0037287 A1 | 2/2009 | Baitalmal et al. |
| 2009/0037492 A1 | 2/2009 | Baitalmal et al. |
| 2009/0189743 A1 | 7/2009 | Abraham et al. |
| 2009/0192858 A1 | 7/2009 | Johnson |

OTHER PUBLICATIONS

"American Software Announces ASP Pricing Model for It's a-Applications Expense Business Solution"; PR Newswire; Mar. 6, 2000; 2 pages.

Anon.; "Sequent Corp Bell Atlantic: Bell Atlantic Selects Sequent for Video-on-Demand Program; Sequent Moves to Sieze Opportunity in New Market"; Business Wire; Dec. 6, 1994.

Anon.; "State of the Art Reports 13,000 MAS 90 for Windows Shipments in First Nine Months of Availability"; PR Newswire; Apr. 28, 1997.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Avery, S.; "Buyers' Guide to Software for Purchasing 2000.(Directory)"; Purchasing, vol. 129, No. 1; p. 179; Jul. 13, 2000.

Bastani et al.; "Complex Open System Design by Quasi Agents: Process Oriented Modeling in Agent Based Systems"; ACM SIGSOFT; vol. 34, No. 4; 2009; pp. 1-14.

Bastani et al.; "Process Oriented Abstraction of the Complex Evolvable Systems: Problem Model Construction"; ACM SIGSOFT; vol. 33, No. 3; 2008; pp. 1-13.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

"Cendant Announces Comprehensive Online Travel Booking to Meet President Bush's eTravel Initiative"; PR Newswire; Jul. 9, 2002; 3 pages.

Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.

(56) References Cited

OTHER PUBLICATIONS

Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framework"; Software—Concepts & Tools; vol. 19, No. 1; 1998; pp. 29-36.
Duc et al.; "Uniform Object Modeling Methodology and Reuse of Real Time System Using UML"; EMSOFT '05; Sep. 19-22, 2005; pp. 44-47.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
Gomaa et al.; "Model Based Software Design and Adaption"; International Workshop on Software Engineering for Adaptive and Self-Managing Systems (SEAMS '07); IEEE; 2007; 10 pages.
He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.
Huang, S. et al.; "Computer-Assisted Supply Chain Configuration Based on Supply Chain Operations Reference (SCOR) Model"; Computers & Industrial Engineering 48; 2005; pp. 377-394.
"Hudson's Bay Company Realizes Fast ROI with the Oracle E-Business Suite"; PR Newswire; New York; Jan. 15, 2002; p. 1.
Intuit Canada Ltd.; "Startup Guide—QuickBooks Basic for Windows, QuickBooks Pro for Windows, QuickBooks Premier for Windows"; 2002; 230 pages.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.
Kythe, D.K.; "The Promise of Distributed Business Components"; Bell Labs Technical Journal; vol. 75, No. 2; Mar./Apr. 1999; pp. 20-28.
Lambert et al.; "Supply Chain Metrics"; International Journal of Logistics Management; vol. 12, No. 1; 2001; pp. 1-19.
Linthicum, D.S.; "Chapter 9: RPCs, Messaging, and B2B Application Integration"; B2B Application Integration: E-Business Enable Your Enterprise; 2001; pp. 167-181.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
Nori A.K. et al.; "Composite Applications: Process Based Application Development"; Lecture Notes in Computer Science; vol. 2444; Aug. 2003; pp. 48-53.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Schultz, G.J.; "Keeping SCOR on Your Supply Chain: Basic Operations Reference Model Updates with the Times"; Information Strategy: The Executive's Journal; Summer 2003; pp. 12-20.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
Stojanovic, Z. et al.; "Modeling and Design of Service-Oriented Architecture"; Systems, Man and Cybernetics; 2004 IEEE International Conference on the Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vergil Technology Ltd.; "Vergil Composite Application Builder Suite"; Product Datasheet [online]; 2003; pp. 1-5; http://www.webservicesmall.com.docs/VCAB_datasheet.pdf.
Vogel et al.; "mySAP ERP for Dummies"; Published on Sep. 30, 2005; Downloaded on Mar. 23, 2001 from <http://proquest.safaribooksonline.com/9780764599958> 41 pages.
Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.

(56) References Cited

OTHER PUBLICATIONS

International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Mar. 25, 2009; 12 pages.
Office Action issued in U.S. Appl. No. 11/322,772; Dec. 9, 2009; 14 pages.
Office Action issued in U.S. Appl. No. 11/322,398 on Apr. 2, 2010; 39 pages.
Office Action issued in U.S. Appl. No. 11/322,383; Nov. 12, 2009; 29 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041; Apr. 30, 2009; 25 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,288; May 20, 2010; 15 pages.
Office Action issued in U.S. Appl. No. 11/396,288; Jan. 2, 2009; 26 pages.
Office Action issued in U.S. Appl. No. 11/396,288; Apr. 15, 2008; 26 pages.
Office Action issued in U.S. Appl. No. 11/396,288; Aug. 19, 2009; 20 pages.
Office Action issued in U.S. Appl. No. 11/396,258; Nov. 25, 2009; 9 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Sep. 4, 2009; 36 pages.
Office Action issued in U.S. Appl. No. 11/323,039; Apr. 14, 2010; 15 pages.
Office Action issued in U.S. Appl. No. 11/322,851; Sep. 2, 2009; 32 pages.
Office Action issued in U.S. Appl. No. 11/322,851; May 12, 2010; 15 pages.
Office Action issued in U.S. Appl. No. 11/323,040; Jul. 24, 2009; 35 pages.
Office Action issued in U.S. Appl. No. 11/323,040; Apr. 29, 2010; 17 pages.
Office Action issued in U.S. Appl. No. 11/322,612; May 11, 2009; 23 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Office Action issued in U.S. Appl. No. 11/397,026; Jul. 21, 2009; 28 pages.
Notice of Allowance issued in U.S. Appl. No. 11/397,026 on Mar. 29, 2010; 17 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Office Action issued in U.S. Appl. No. 11/322,482; Jan. 7, 2010; 19 pages.
Office Action issued in U.S. Appl. No. 11/323,590; Jan. 9, 2009; 23 pages.
Office Action issued in U.S. Appl. No. 11/323,590; Jul. 10, 2009; 32 pages.
Office Action issued in U.S. Appl. No. 11/323,590; Dec. 30, 2009; 31 pages.
Office Action issued in U.S. Appl. No. 11/323,590; Jun. 21, 2010; 25 pages.
Office Action issued in U.S. Appl. No. 11/323,634; Sep. 10, 2009; 15 pages.
Office Action issued in U.S. Appl. No. 11/323,634; Apr. 2, 2010; 9 pages.
Office Action issued in U.S. Appl. No. 11/322,816; Jul. 23, 2009; 41 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Jun. 25, 2009; 9 pages.
Office Action issued in U.S. Appl. No. 12/333,085; Mar. 23, 2010; 5 pages.
Cascallar, Eduardo et al.; "Assessment in the Evaluation of Self-Regulation as a Process"; Educational Psychology Review; vol. 18, No. 3; Sep. 2006; pp. 297-306.
Cool, David W.; "Activity Fund Accounting"; School Business Affairs; vol. 49, No. 6; Jun. 1983; pp. 50-52.

(56) References Cited

OTHER PUBLICATIONS

Ferscha et al.; "A Light-Weight Component Model for Peer-to-Peer Applications"; IEEE; Mar. 23, 2004,.
Flissi et al.; "A Component-based Software Infrastructure for Ubiquitous Computing"; IEEE; Jul. 4, 2005.
SAP AG; "SAP NetWeaver Visual Composer: User Guide (SAP NetWeaver Visual Composer release 6.0)"; Document version 1.1; pp. 1-208.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Office Action issued in U.S. Appl. No. 11/322,772; Jul. 12, 2010; 18 pages.
Notice of Allowance issued in U.S. Appl. No. 11/322,398 on Jul. 23, 2010; 38 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowance issued in U.S. Appl. No. 1/322,382 on Sep. 20, 2010; 6 pages.
Notice of Allowance issued in U.S. Appl. No. 11/396,259 on Jul. 6, 2010; 6 pages.
Notice of Allowance issued in U.S. Appl. No. 11/396,259 on Oct. 15, 2010; 6 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Office Action issued in U.S. Appl. No. 11/322,845; Jul. 15, 2010; 16 pages.
Notice of Allowance issued in U.S. Appl. No. 11/322,845; Dec. 27, 2010; 16 pages.
Office Action issued in U.S. Appl. No. 11/323,040 on Nov. 5, 2010; 33 pages.
Supplemental Notice of Allowance issued in U.S. Appli. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/397,026 on Nov. 15, 2010; 7 pages.
Notice of Allowance issued in U.S. Appl. No. 12/233,554 on Sep. 17, 2010; 10 pages.
Notice of Allowance issued in U.S. Appl. No. 11/968,054 on Sep. 7, 2010; 11 pages.
Office Action issued in U.S. Appl. No. 12/233,557 on Sep. 16, 2010; 16 pages.
Notice of Allowance issued in U.S. Appl. No. 12/233,534 on Oct. 20, 2010; 15 pages.
Notice of Allowance issued in U.S. Appl. No. 12/327,354 on Oct. 18, 2010; 16 pages.
Notice of Allowance issued in U.S. Appl. No. 11/322,482; Jul. 13, 2010; 5 pages.
Office Action issued in U.S. Appl. No. 11/322,973 on Dec. 7, 2010; 13 pages.
Office Action issued in U.S. Appl. No. 11/404,147 on Nov. 24, 2010; 27 pages.
Office Action issued in U.S. Appl. No. 11/967,483; Aug. 20, 2010; 10 pages.
Notice of Allowance issued in U.S. Appl. No. 12/333,085; Sep. 13, 2010; 8 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Finin et al.; "KQML as an Agent Communication Language"; retrieved on Jul. 26, 2011; pp. 456-463. <http://portal.acm.org/citation.cfm?id=191322>.
Gould; "Integrating the Manufacturing Enterprise"; Automative Design & Production; 119, 1; ABI/INFORM Global; Jan. 2007; 3 pages.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
SAP AG; "Powered by SAP NetWeaver Partner Program—Frequently Asked Questions"; May 2005; 10 pages. [online] http://www.lionbridge.com/NR/rdonlyres/4940BE1F/DA46/412E/AB16/F049BD865CA1/0/PBMWFAQ_50070686_en.pdf.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Office Action issued in U.S. Appl. No. 11/323,634 on Apr. 29, 2011; 8 pages.
Office Action issued in U.S. Appl. No. 11/322,973 on May 27, 2011; 15 pages.
Notice of Allowance issued in U.S. Appl. No. 11/396,327 on Nov. 30, 2010; 28 pages.
Office Action issued in U.S. Appl. No. 11/404,147 on Aug. 4, 2011; 26 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Office Action issued in U.S. Appl. No. 12/233,457 on May 26, 2011; 19 pages.
Office Action issued in U.S. Appl. No. 11/967,483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Office Action issued in U.S. Appl. No. 12/233,087 on Aug. 18, 2011; 42 pages.

(56) References Cited

OTHER PUBLICATIONS

Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Notice of Allowance issued in U.S. Appl. No. 11/322,610 on Mar. 31, 2011; 6 pages.
Notice of Allowanced issued in U.S. Appl. No. 11/322,398 on May 27, 2011; 21 pages.
Notice of Allowance issued in U.S. Appl. No. 11/396,259 on Jan. 20, 2011; 6 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,845; Apr. 8, 2011; 8 pages.
Office Action issued in U.S. Appl. No. 11/323,040 on Jul. 26, 2011; 34 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 o n. Apr. 15, 2011; 12 pages.
Notice of Allowance issued in U.S. Appl. No. 12/327,354 on Feb. 1, 2011; 16 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,890 on Jul. 15, 2011; 7 pages.

* cited by examiner

PROVIDING PAYMENT SOFTWARE APPLICATION AS ENTERPRISE SERVICES

BACKGROUND

This specification relates to data processing systems implemented on computers and, more particularly, to data processing systems providing services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standard-based way of encapsulating the functionality of an application that other applications can locate and access. A service-oriented architecture is a distributed software model within which all functionality is defined as independent web services. Within a service-oriented architecture, web services can be used in defined sequences according to the business logic to form applications that enable business processes.

SUMMARY

This specification describes a services architecture design that provides enterprise services having payment functionality at the level of an enterprise application. Enterprise services are web services that have an enterprise-level business value.

In its various aspects, the invention can be embodied in systems, methods, and computer program products. For example, a system in one embodiment implements a services architecture design that provides enterprise services having payment functionality at the level of an enterprise application. The design includes a set of service operations, process components, and optionally deployment units. Suitable business objects are also described.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1A:
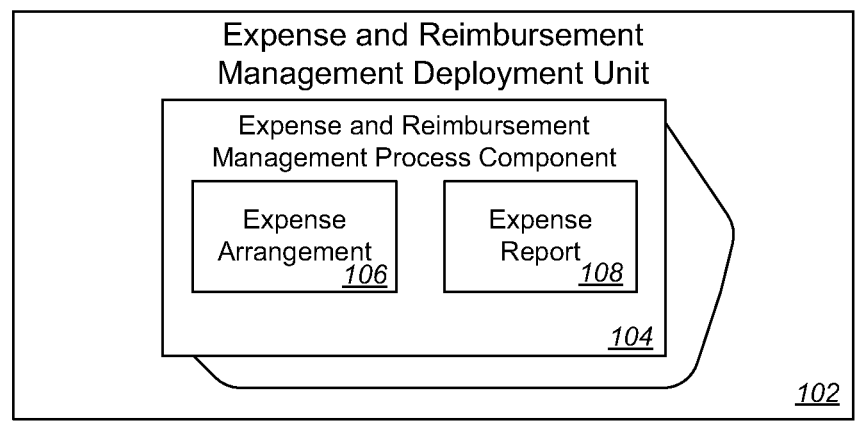
FIGS. 1A, 1B, and 1C collectively illustrate a high-level view of a software architectural design and implementation of a suite enterprise software services having payment functionality.
Figure 1B:
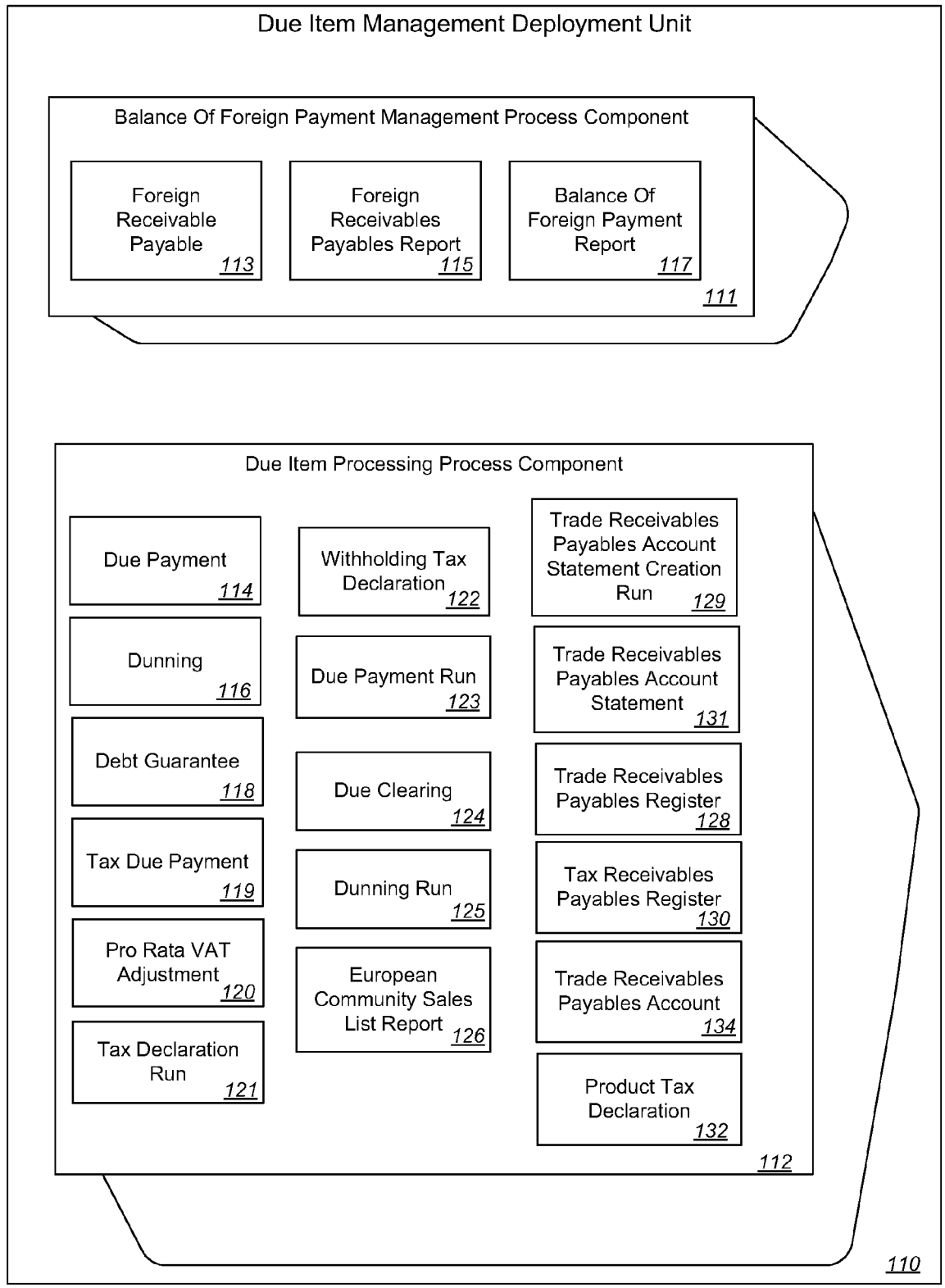
Figure 1C:
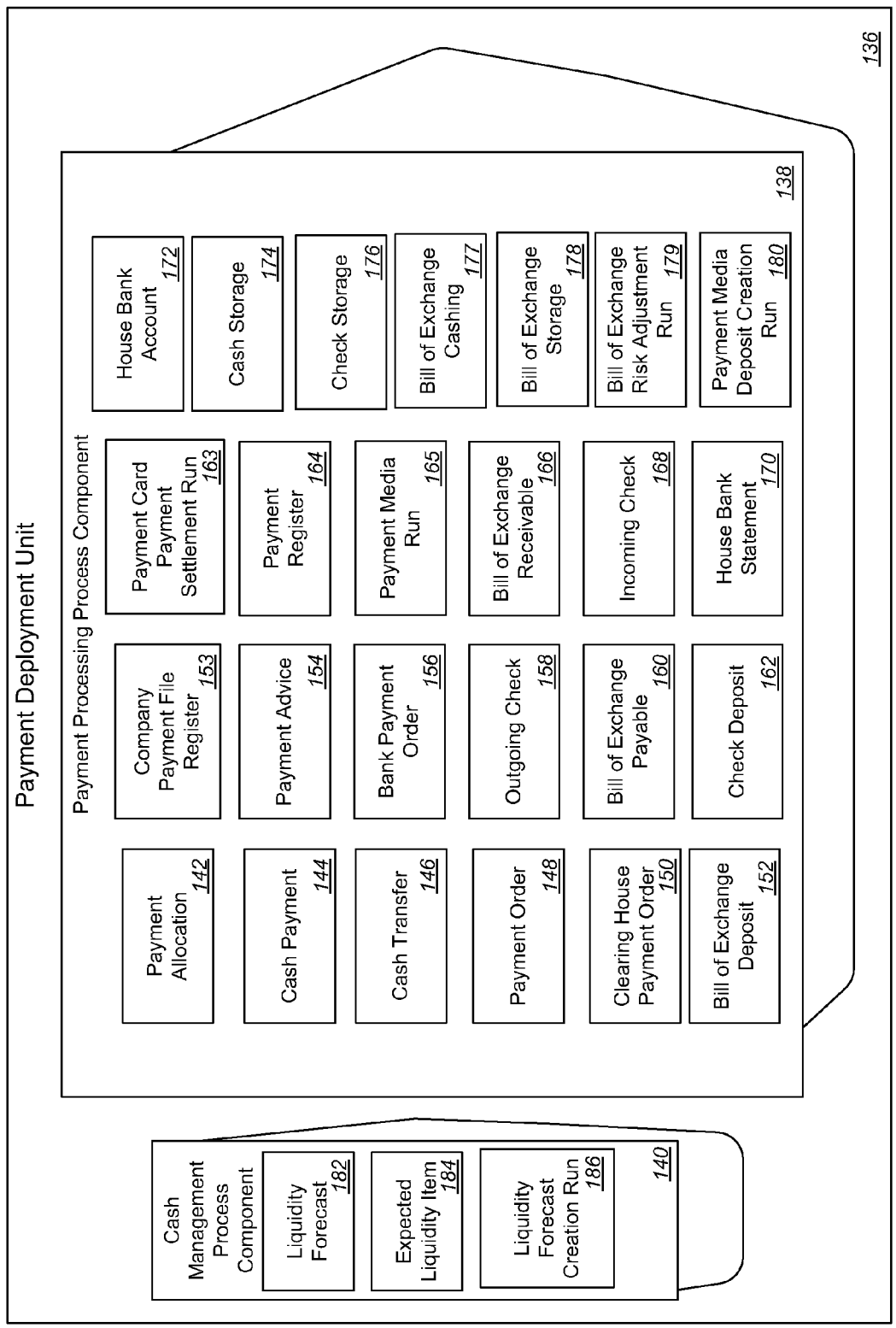

FIGS. 1A, 1B, and 1C collectively illustrate a high-level view of a software architectural design and of an application software implementation that provides a suite of enterprise service operations, which can be organized into interfaces, having payment application functionality. The software corresponding to FIGS. 1A, 1B, and 1C, in one implementation, is for deployment in an application layer of an application server.

The elements of the architecture include the business object, the process component, the service operation (or simply, the operation), the service interface, the message, and the deployment unit. The elements can also include process agents and reuse service components. These will be generally described below.

In one implementation, the software is implemented to be deployed on an application platform that includes a foundation layer that contains all fundamental entities that can be used from multiple deployment units. These entities can be process components, business objects or reuse service components. A reuse service component is a piece of software that is reused in different transactions. A reuse service component is used by its defined interfaces, which can be, e.g., local APIs (Application Programming Interfaces) or service interfaces.

The architectural design is a specification of a computer software application, and elements of the architectural design can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects. A business object represents a specific view on some well-defined business content. A business object represents content, and instances of business objects include content, which a typical business user would expect and understand with little explanation. Whether an object as a type or an instance of an object is intended by the term is generally clear from the context, so the distinction will be made explicitly only when necessary. Properly implemented, business objects are implemented free of redundancies.

Business objects are further categorized as business process objects and master data objects. A business object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run. An instance of a mass data run object contains a particular set of selections and parameters. A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not have its own persistency.

The architectural elements also include the process component. A process component is a software package that realizes a business process and generally exposes its functionality as services. The functionality contains business transactions. A process component contains one or more semantically related business objects. Any business object belongs to no more than one process component. Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them serving as a signature. For convenience in supporting use of the operations supported by a system implementing elements of the design, such a system can optionally include a repository of service descriptions that includes a standards-based description of each of the supported service operations.

The architectural elements also include the service interface, which may be referred to simply as an interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous. Asynchronous outbound process agents are called after a business object changes, e.g., after a create, update, or delete of a business object instance. Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are preferably assigned to their respective deployment unit.

FIGS. 1A, 1B, and 1C collectively illustrate a high-level view of a software architectural design and implementation of a suite enterprise software services having payment functionality.

As shown in FIG. 1A, an Expense and Reimbursement Management deployment unit 102 includes an Expense and Reimbursement Management process component 104. The Expense and Reimbursement Management process component 104 includes an Expense Arrangement business object 106 and an Expense Report business object 108.

The expense report business object 108 represents a list of receipts for the expenses incurred for the company within a certain period of time that are to be reimbursed to an expense reporter. The expense arrangement business object 106 represents a definition by the company of parameters for an employee that are needed for expense reports.

As shown in FIG. 1B, a Due Item Management deployment unit 110 includes a Due Item Processing process component 112 and a Balance of Foreign Payment Management Process Component 111.

The Due Item Processing process component 112 includes a Due Payment business object 114, a Dunning business object 116, a Debt Guarantee business object 118, a Tax Due Payment business object 119, a Pro Rata VAT Adjustment business object 120, a Tax Declaration Run business object 121, a Withholding Tax Declaration business object 122, a Due Payment Run business object 123, a Due Clearing business object 124, a Dunning Run business object 125, a European Community Sales List Report business object 126, a Trade Receivables Payables Register business object 128, a Trade Receivables Payables Account Statement Creation Run business object 129, a Tax Receivables Payables Register business object 130, a Trade Receivables Payables Account Statement business object 131, a Product Tax Declaration business object 132, and a Trade Receivables Payables Account business object 134.

The Balance of Foreign Payment Management Process Component 111 includes a Foreign Receivable Payable business object 113, a Foreign Receivables Payables Report business object 115, and a Balance of Foreign Payment Report business object 117.

The Debt Guarantee business object 118 represents illustration of the contingent liabilities and demands from endorsements, payment warranties and other guarantees for third, deficiency guarantee, limited endorsement, directly liable endorsement, joint guarantee. The Due Payment Run business object 123 represents the specification of an automated run that creates payment requests based on due trade receivables and payables. The Due Payment business object 114 represents a payment request or payment confirmation with regard to trade receivables and payables. The Product Tax Declaration business object 132 represents a declaration of the product tax payables/receivables of a company to the responsible tax authority according to the tax declaration arrangement and country specific legal requirements that triggers the payment to the tax authority. The Tax Due Payment business object 119 represents a payment request or payment confirmation with regard to tax payables and receivables.

The Tax Receivables Payables Register business object 130 represents the register of the tax receivables and payables of a company. The European Community Sales List Report business object 126 represents a declaration of the statistical VAT tax payables/receivables of a European member state company to a tax authority according to the tax declaration arrangement and country specific legal requirements. The Due Clearing business object 124 represents a group of receivables and payables for clearing. The Trade Receivables Payables Account Statement business object 131 represents a list of the increases or decreases to trade receivables or payables of a company from or to a business partner within a certain time period. The Dunning Run business object 125 represents the specification of an automated run that creates dunning proposals based on trade receivables and payables accounts. The Dunning business object 116 represents a reminder or demand from a company (creditor) to a business partner (debtor) to make a payment by a certain point in time. The Trade Receivables Payables Account Statement Creation Run business object 129 represents the specification of an automated run that creates account statements for trade receivables and payables based on trade receivables and payables accounts.

The Tax Declaration Run business object 121 represents a specification of an automated run that creates tax declarations (product tax declaration or European community sales list report) based on a selection of tax receivable payable split items. The Withholding Tax Declaration business object 122 represents a declaration of withholding tax payables of a company to a tax authority according to the tax declaration arrangement and country specific legal requirements that triggers the payment to the tax authority if required. The Trade Receivables Payables Account business object 134 represents an account of all trade receivables and payables of a company from or to a business partner. The Trade Receivables Payables Register business object 128 represents the register of the trade receivables and payables of a company from or to its business partners. The Pro Rata VAT Adjustment business object 120 represents an adjustment of tax receivables/payables to account for the difference between the provisional and the definitive pro rata VAT coefficient.

The Foreign Receivables Payables Report business object 115 represents report to the central bank about trade receivables from and payables to non-residents according to foreign trade regulations. The Foreign Receivable Payable business object 113 represents receivable from or payable to a non-resident business partner. The balance Of Foreign Payment Report business object 117 represents report to the central bank about foreign payments according foreign trade regulations in a predefined format stipulated by the central bank.

As shown in FIG. 1C, a Payment deployment unit 136 includes a Payment Processing process component 138 and a Cash Management process component 140. The Payment Processing process component 138 includes a Payment Allocation business object 142, a Cash Payment business object 144, a Cash Transfer business object 146, a Payment Order business object 148, a Clearing House Payment Order business object 150, a Bill of Exchange Deposit business object 152, a Company Payment File Register business object 153, a Payment Advice business object 154, a Bank Payment Order business object 156, an Outgoing Check business object 158, a Bill of Exchange Payable business object 160, a Check Deposit business object 162, a Payment Card Payment Settlement Run business object 163, a Payment Register business object 164, a Payment Media Run business object 165, a Bill of Exchange Receivable business object 166, an Incoming Check business object 168, a House Bank Statement business object 170, a House Bank Account business object 172, a Cash Storage business object 174, a Check Storage business object 176, a Bill of Exchange Cashing business object 177, a Bill of Exchange Storage business object 178, a Bill of Exchange Risk Adjustment Run business object 179, and a Payment Media Deposit Creation Run business object 180.

The Cash Management process component 140 includes a Liquidity Forecast business object 182, an Expected Liquidity Item business object 184, and a Liquidity Forecast Creating Run business object 186.

The Bill Of Exchange Cashing business object 177 represents a cashing of bills of exchange payable at a house bank for debit from a house bank account. The Payment Order business object 148 represents an order within a company to make a payment to a business partner at a specified time. The Payment Advice business object 154 represents an announcement of a payment transaction by a business partner to the company, specifying payment reasons. The Cash Storage business object 174 represents a company's storage for cash of a currency. The House Bank Statement business object 170 represents a legally binding notification from the house bank about the revenues within a specific time period at a house bank account with a defined starting and closing balance.

The Clearing House Payment Order business object 150 represents an order to a clearing house for card payments to settle an incoming card payment using a clearing house account. The Payment Allocation business object 142 represents an assignment of a payment item to the payment reasons from which the payment item originated. The Payment Media Run business object 165 represents the specification of an automated run that creates payment media for bank transfers, debit memos, checks, and bills of exchange based on outgoing checks, bank payment orders, payment orders, and bills of exchange receivable and payable. The Check Storage business object 176 represents a location for incoming checks that a company receives from its business partners, such as customers.

The Bill of Exchange Deposit business object 152 represents a deposit of bills of exchange receivable at a house bank for credit to a house bank account. The Outgoing Check business object 158 represents a check issued by a company payable to a business partner to fulfill a payment order. The Bank Payment Order business object 156 represents an order to a house bank to make a transfer or direct debit from a specified house bank account to fulfill a payment order. The Payment Register business object 164 represents the register of incoming and outgoing payments of a company that can be initiated by the company as well as by a business partner.

The Incoming Check business object 168 represents a check issued by a business partner payable to the company. The Check Deposit business object 162 represents a deposit of checks at a house bank for credit to a house bank account. The Payment Media Deposit Creation Run business object 180 represents the specification of an automated run that creates payment media deposits to be submitted to a house bank based on bill of exchange receivables and incoming checks. The Bill of Exchange Receivable business object 166 represents a bill of exchange issued either by the company or by a business partner for the benefit of the company. The Bill of Exchange Payable business object 160 represents a bill of exchange for an outgoing payment.

The Bill of Exchange Storage business object 178 represents a company's location for bills of exchange receivable of one currency. The Cash Payment business object 144 represents inflow or outflow of cash in or from cash storage. The Bill of Exchange Risk Adjustment Run business object 179 represents the specification of an automatic adjustment of the risk due to discounted bills of exchange receivable. The Company Payment File Register business object 153 represents a company's register for payment files that are exchanged with house banks. The House Bank Account business object 172 represents an internal representation of a company's bank account at a house bank. The Payment Card Payment Settlement Run business object 163 represents the specification of an automated run that creates settlement requests for clearing house payment orders to a clearing house based on clearing house payment orders. The Cash Transfer business object 146 represents a company-internal money transfer that includes the following payments: from one house bank account to another, from one cash storage to another, from a cash storage to a house bank account, and from a house bank account to a cash storage.

The Liquidity Forecast business object 182 represents a preview of the medium- to long-term development of the liquidity situation of a company or a group of companies. The Liquidity Forecast Creation Run business object 186 represents the specification of an automated run that creates a liquidity forecast based on the trade receivables payables register, tax receivables payables register, payment register, and expected liquidity items. The Expected Liquidity Item business object 184 represents an expected single amount that increases or reduces the liquidity of a company.

Figure 2A:
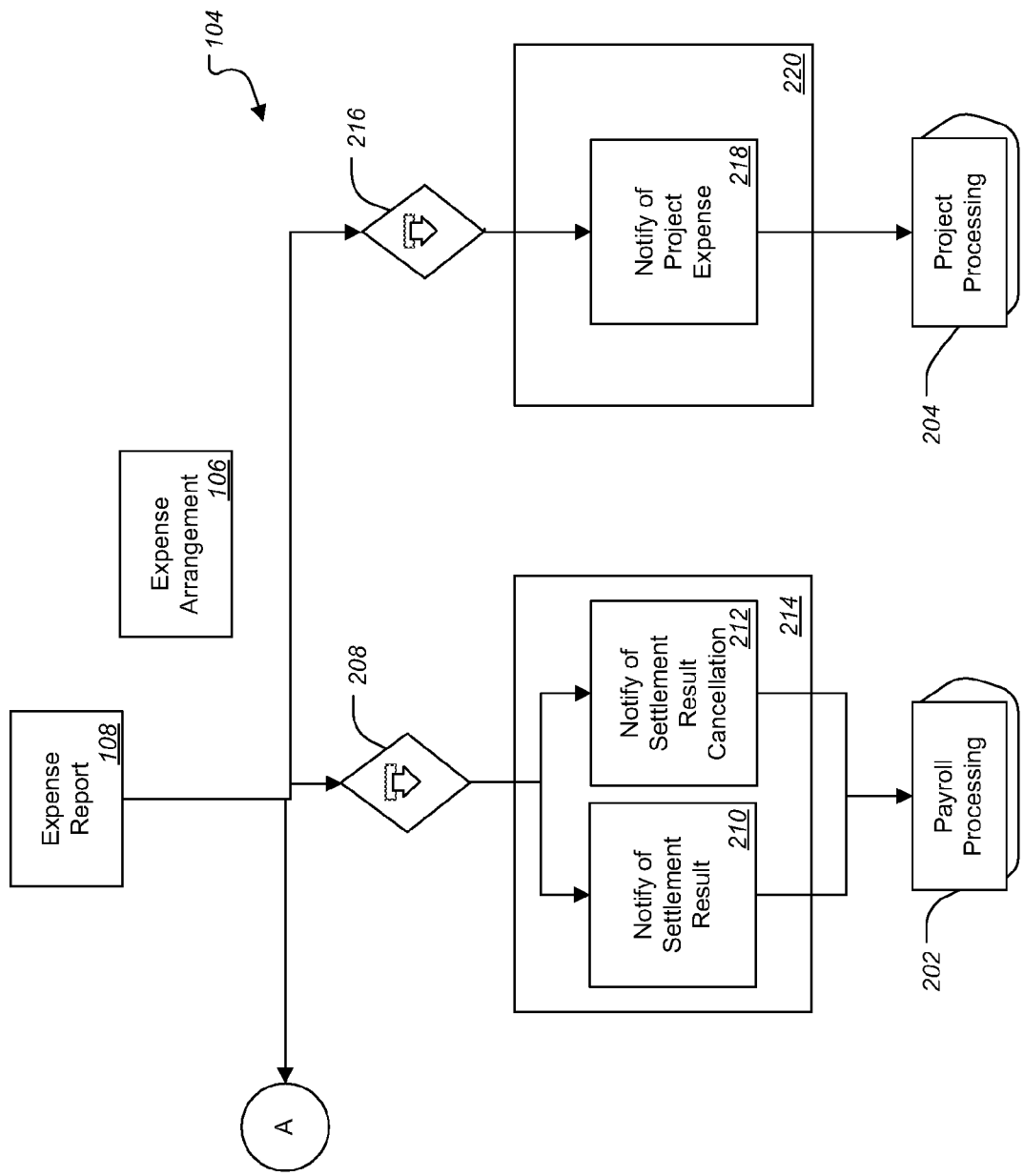
FIGS. 2A and 2B are block diagrams collectively showing an expense and reimbursement management process component.
Figure 2B:
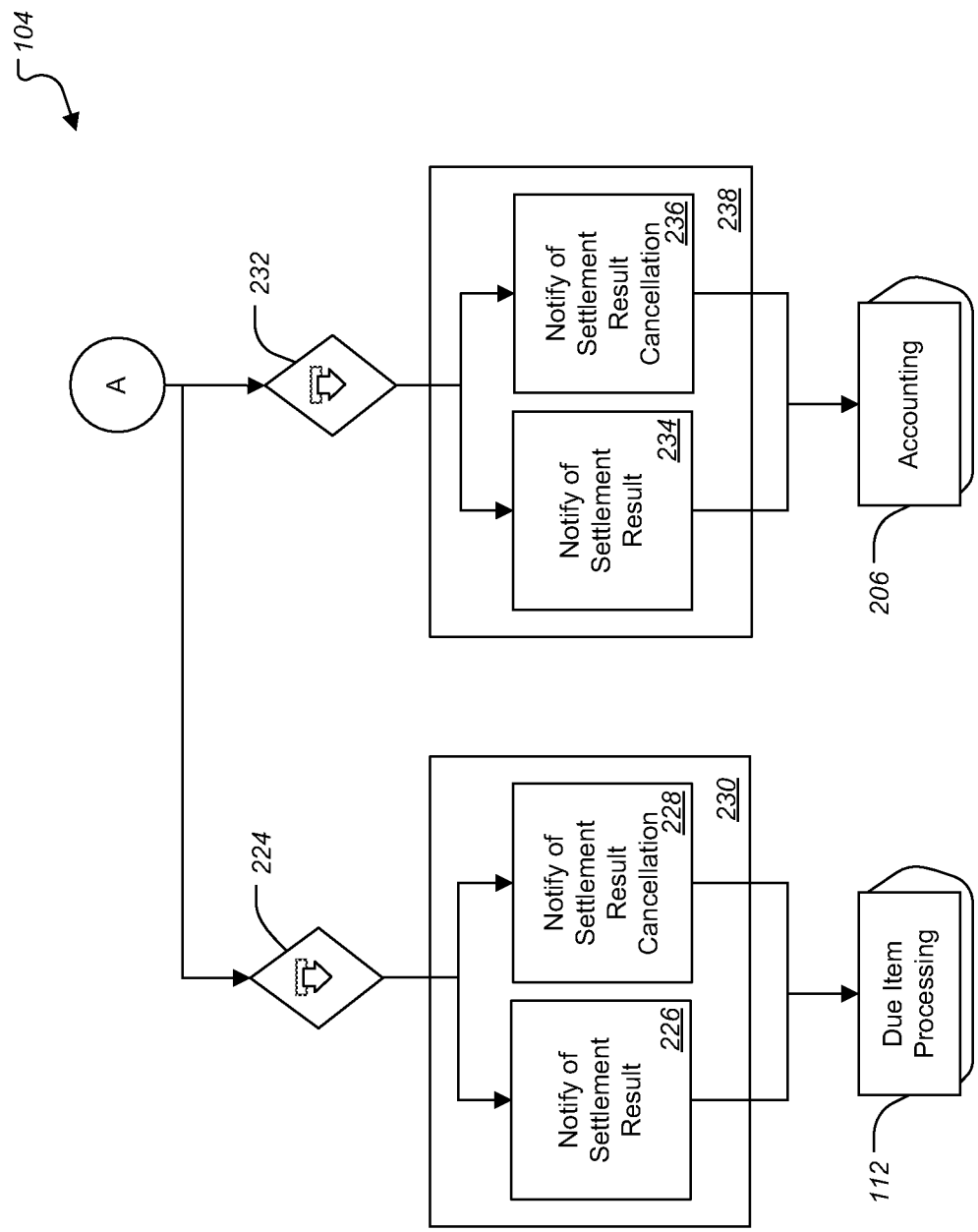

FIGS. 2A and 2B are block diagrams collectively showing the Expense and Reimbursement Management process component 104 (FIG. 1A). For convenience in describing this process component, a number of other process components are shown in the figures; these other process components are not part of the process component being described. These other process components are a Payroll Processing process component 202, a Project Processing process component 204, the Due Item Processing process component 112, and an Accounting process component 206. These other process components are used to represent software external to the process component in describing its interactions with the external software; however, while the external software can be implemented as such process components, this is not required.

As shown in FIG. 2A, the Expense Arrangement business object 106 and the Expense Report business object 108 are included in the Expense and Reimbursement Management process component 104. The Expense Arrangement business object 106 represents a definition by the company of parameters used in expense reports. For example, the Expense Arrangement business object 106 can be used to determine per diem amounts, the type of standard vehicle, and the standard cost distribution. The Expense Report business object 108 represents a list of receipts for the expenses incurred for the company within a certain period of time that are to be reimbursed to an expense reporter. In the case of a business trip, it also contains the reason for the trip and general information such as destinations, dates and times, and mileages. The Expense Report business object 108 can receive updated information and send the update into other components to perform further operations.

As shown in FIGS. 2A and 2B, multiple outbound process agents can receive information from the Expense Report business object 108. An outbound process agent 216 invokes a Notify Project Expense operation 218. For example, the outbound process agent 216 can send a notification of an expense that applies to an existing project. The notification is sent to the Project Processing process component 204. The Notify Project Expense operation 218 is included in a Liquidity Information Out interface 220.

An outbound process agent 208 can invoke a Notify of Settlement Result operation 210. For example, the outbound process agent 208 can send a notification of a settlement in order to handle all amounts subject to taxation for updating payroll processing. The notification is sent to the Payroll Processing process component 202. Similarly, the outbound process agent 208 can invoke a Notify of Settlement Result Cancellation operation 212. For example, the outbound process agent 208 can send a notification to cancel a settlement result in payroll processing. The notification is sent to the Payroll Processing process component 202. The Notify of Settlement Result operation 210 and the Notify of Settlement Result Cancellation operation 212 are included in an Expense Report in Payroll Input Maintenance Out interface 214.

As shown in FIG. 2B, an outbound process agent 224 can invoke a Notify of Settlement Result operation 226. For example, the outbound process agent 224 can send a notification of a settlement based on an expense report for updating due item processing. The notification is sent to the Due Item Processing process component 112. Similarly, the outbound process agent 224 can invoke a Notify of Settlement Result Cancellation operation 228. For example, the outbound process agent 224 can send a notification to cancel a settlement based on an expense report previously sent to due item processing. The notification is sent to the Due Item Processing process component 112. The Notify of Settlement Result operation 226 and the Notify of Settlement Result Cancellation operation 228 are included in a Receivables Payables Out interface 230.

An outbound process agent 232 can invoke a Notify of Settlement Result operation 234. For example, the outbound process agent 232 can send a notification of a settlement result for accounting. The notification can be sent to the Accounting process component 206. Similarly, the outbound process agent 232 can invoke a Notify of Settlement Result Cancellation operation 236. For example, the outbound process agent 232 can send a notification to cancel a settlement result in accounting. The notification is sent to the Accounting process component 206. The Notify of Settlement Result operation 234 and the Notify of Settlement Result Cancellation operation 236 are included in an Expense Accounting Out interface 238.

Figure 3:
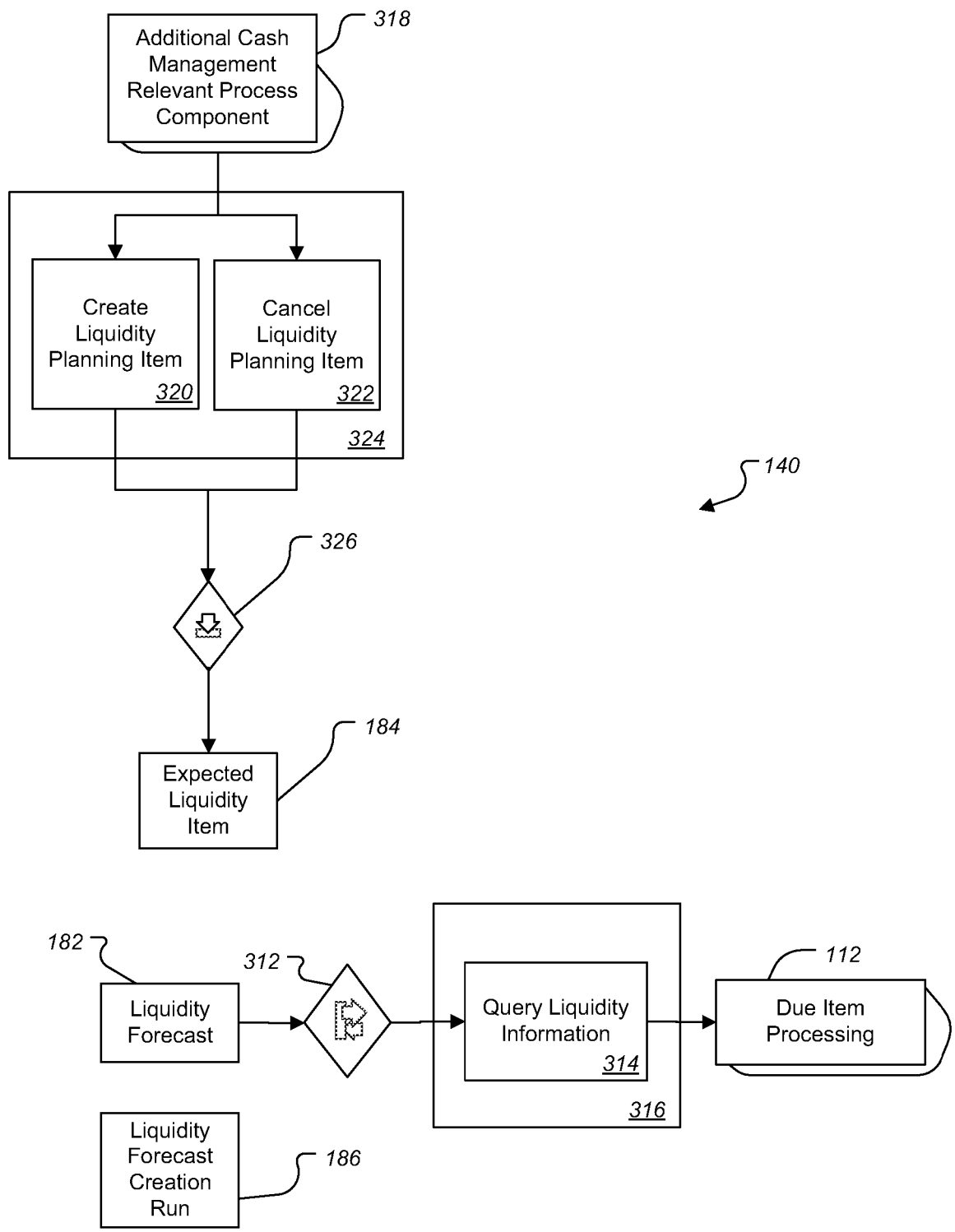
FIG. 3 is a block diagram showing a cash management process component.

FIG. 3 is a block diagram showing the Cash Management process component 140 (FIG. 1C). For convenience in describing this process component, a number of other process components are shown in the figures; these other process components are not part of the process component being described. These other process components are the Due Item Processing process component 112 and an Additional Cash Management Relevant process component 318. These other process components are used to represent software external to the process component in describing its interactions with the external software; however, while the external software can be implemented as such process components, this is not required.

As shown in FIG. 3, the Expected Liquidity Item business object 184, the Liquidity Forecast business object 182, and the Liquidity Forecast Creation Run business object 186 are included in the Case Management process component 140. The Expected Liquidity Item business object 184 is an expected single amount that increases or reduces the liquidity of a company. A Create Liquidity Planning Item operation 320 sends a create liquidity item notification using an inbound process agent 326 to update the Expected Liquidity Item business object 184. For example, the operation 326 can send a create liquidity item notification to update the Expected Liquidity Item business object 184 if input is received from the Additional Cash Management Relevant process component 318.

A Cancel Liquidity Planning Item operation 322 sends a notification to cancel a liquidity item using the inbound process agent 326 to update the Expected Liquidity Item business object 184. For example, the operation 326 can send cancel liquidity item notification to update the Expected Liquidity Item business object 184 if input is received from the Additional Cash Management Relevant process component 318. The Create Liquidity Planning Item operation 320 and the Cancel Liquidity Planning Item operation 322 are included in a Liquidity Planning In interface 324.

The Liquidity Forecast business object 182 can receive updated information and send the update into other components to perform further operations. As shown in FIG. 3, outbound process agents can receive information from the Liquidity Forecast business object 182. A synchronous outbound process agent 312 invokes a Query Liquidity Information operation 314. For example, the outbound process agent 312 can synchronize liquidity forecast status information to other process components, such as the Due Item Processing process component 112. The Query Liquidity Status operation 314 is included in a Liquidity Information Out interface 316. The Liquidity Forecast Creation Run business object 186 represents an automated run that can create a liquidity forecast based on the trade receivables payables register, tax receivables payables register, payment register, and expected liquidity items.

FIGS. 4A, 4B, 4C, 4D, 4E and 4F are block diagrams collectively showing the Payment Processing process component 138 (FIG. 1C). For convenience in describing this process component, a number of other process components are shown in the figures; these other process components are not part of the process component being described. These other process components are the Due Item Processing process component 112, a Migration Data Dispatching process component 410, a Payment Processing at Business Partner process component 401, a Bank Statement Creation at Bank process component 402, a Lock Box File Creation at Provider process component 403, a Customer Invoice Processing process component 404, the Accounting process component 206, a Settlement Processing at Clearing House process component 407, a Bill of Exchange Processing at House Bank process component 409 and a Payment Order Processing at House Bank process component 408. These other process components are used to represent software external to the process component in describing its interactions with the external software; however, while the external software can be implemented as such process components, this is not required.

Figure 4A:
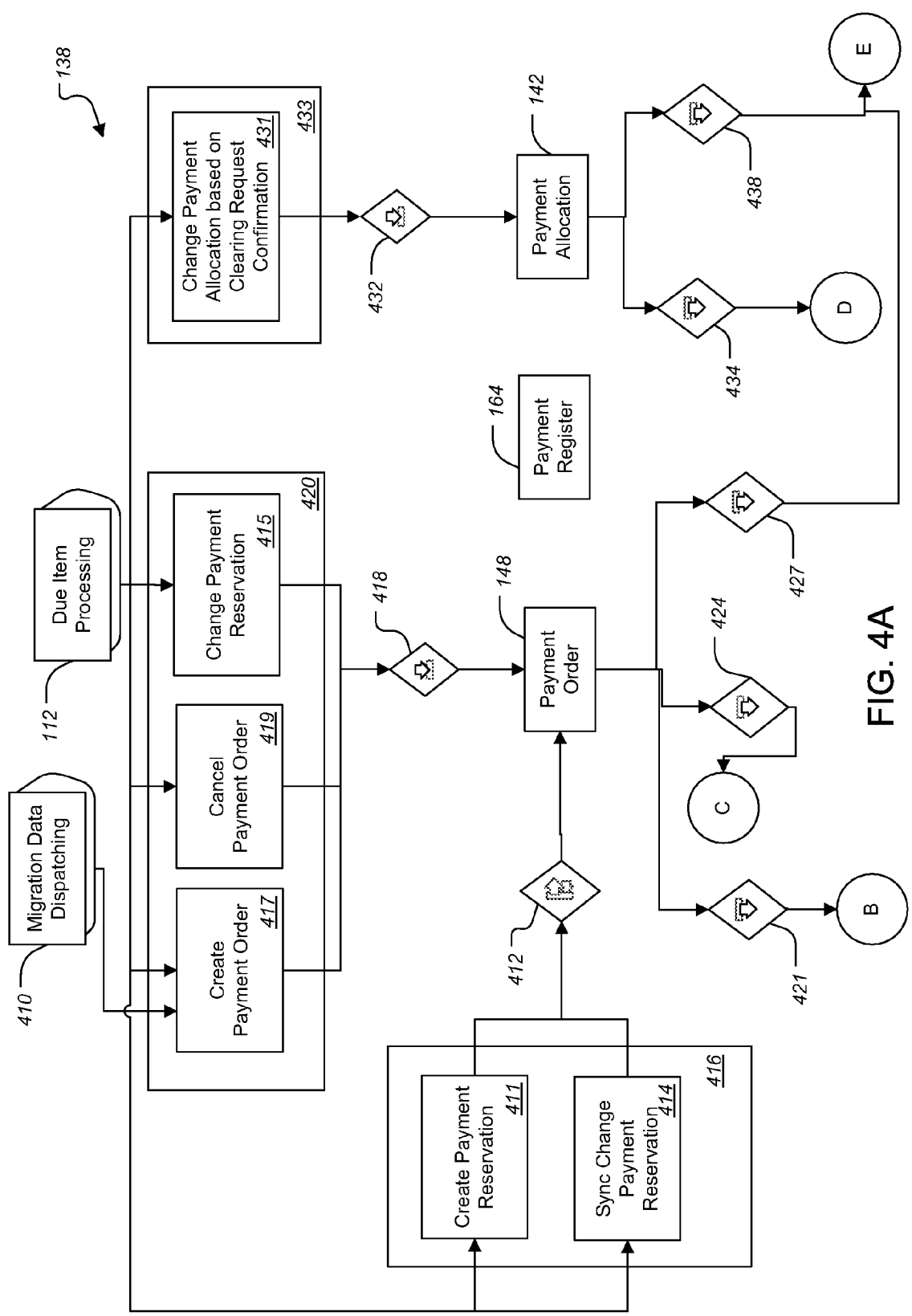
FIGS. 4A, 4B, 4C, 4D, 4E, and 4F are block diagrams collectively showing a payment processing process component.

As shown in FIG. 4A, a Create Payment Reservation operation 411 sends a payment reservation creation request using a synchronous inbound process agent 412 to update the Payment Order business object 148. For example, the operation 411 can send a payment reservation creation request to update the Payment Order business object 148 if input is received from the Due Item Processing process component 112. Similarly, a Synchronous Change Payment Reservation operation 414 sends a payment reservation synchronize change request, also using the synchronous inbound process agent 412 to update the Payment Order business object 148. For example, the operation 414 can send a payment request synchronize change notification to update the Payment Order business object 148 if input is received from the Due Item Processing process component 112. The Create Payment Reservation operation 411 and the Synchronous Change Payment Reservation operation 414 are included in a Payment Request In interface 416.

A Create Payment Order operation 417 sends a payment order creation request using an asynchronous inbound process agent 418 to update the Payment Order business object 148. For example, the operation 417 can send a payment order creation request to update the Payment Order business object 148 if input is received from the Due Item Processing process component 112 or the Migration Data Dispatching process component 410. A Cancel Payment Order operation 419 can send a payment order cancellation request, also using the asynchronous inbound process agent 418 to update the Payment Order business object 148. For example, the operation 419 can send a payment order cancellation request to update the Payment Order business object 148 if input is received from the Due Item Processing process component 112. Similarly, a Change Payment Reservation operation 415 can send a payment reservation change request, also using the asynchronous inbound process agent 418 to update the Payment Order business object 148. For example, the operation 415 can send a payment reservation change request to update the Payment Order business object 148 if input is received from the Due Item Processing process component 112. The Create Payment Order operation 417, the Cancel Payment Order operation 419, and the Change Payment Reservation operation 415 are included in a Payment Request In interface 420.

Figure 4B:
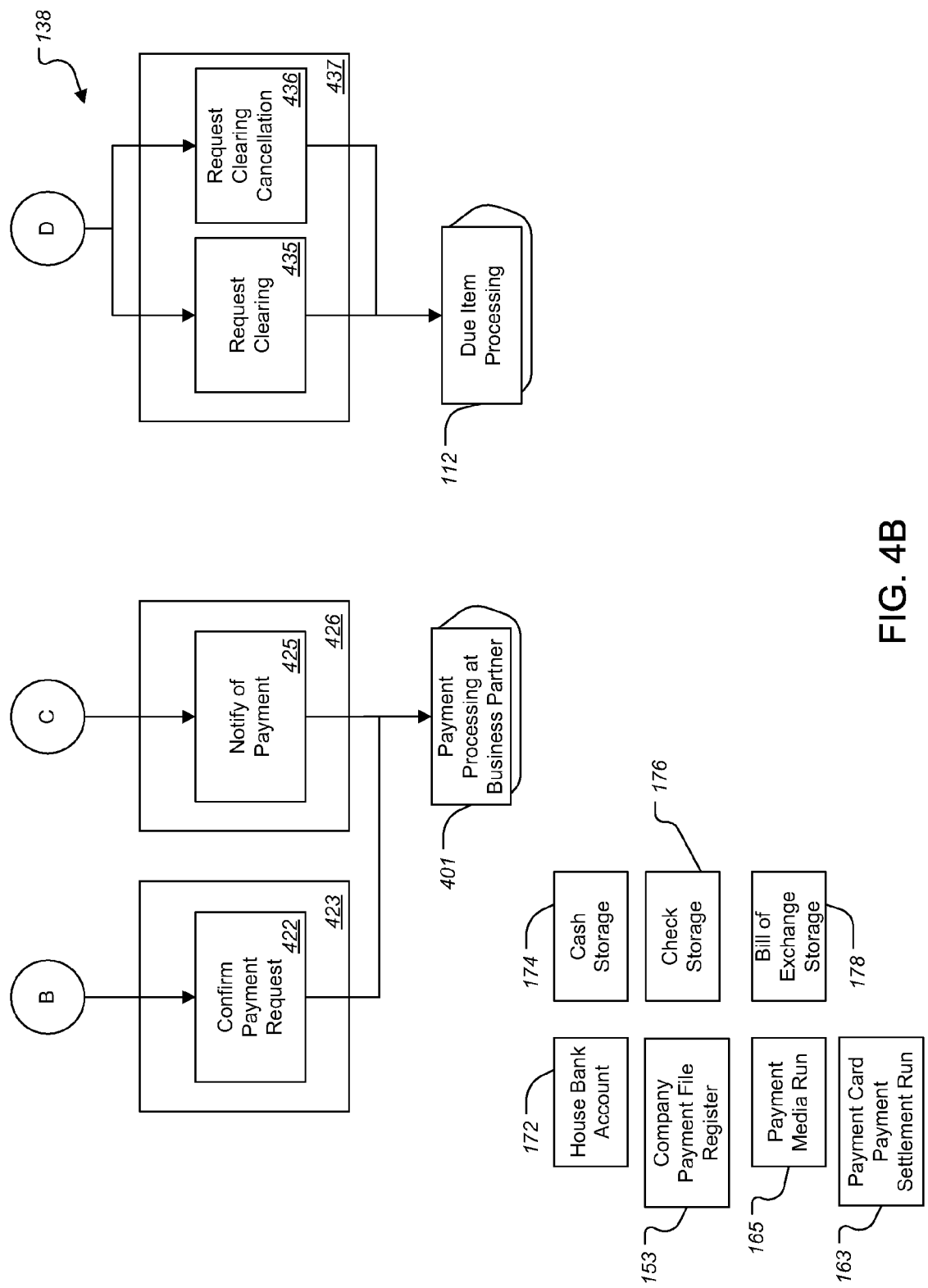
Figure 4C:
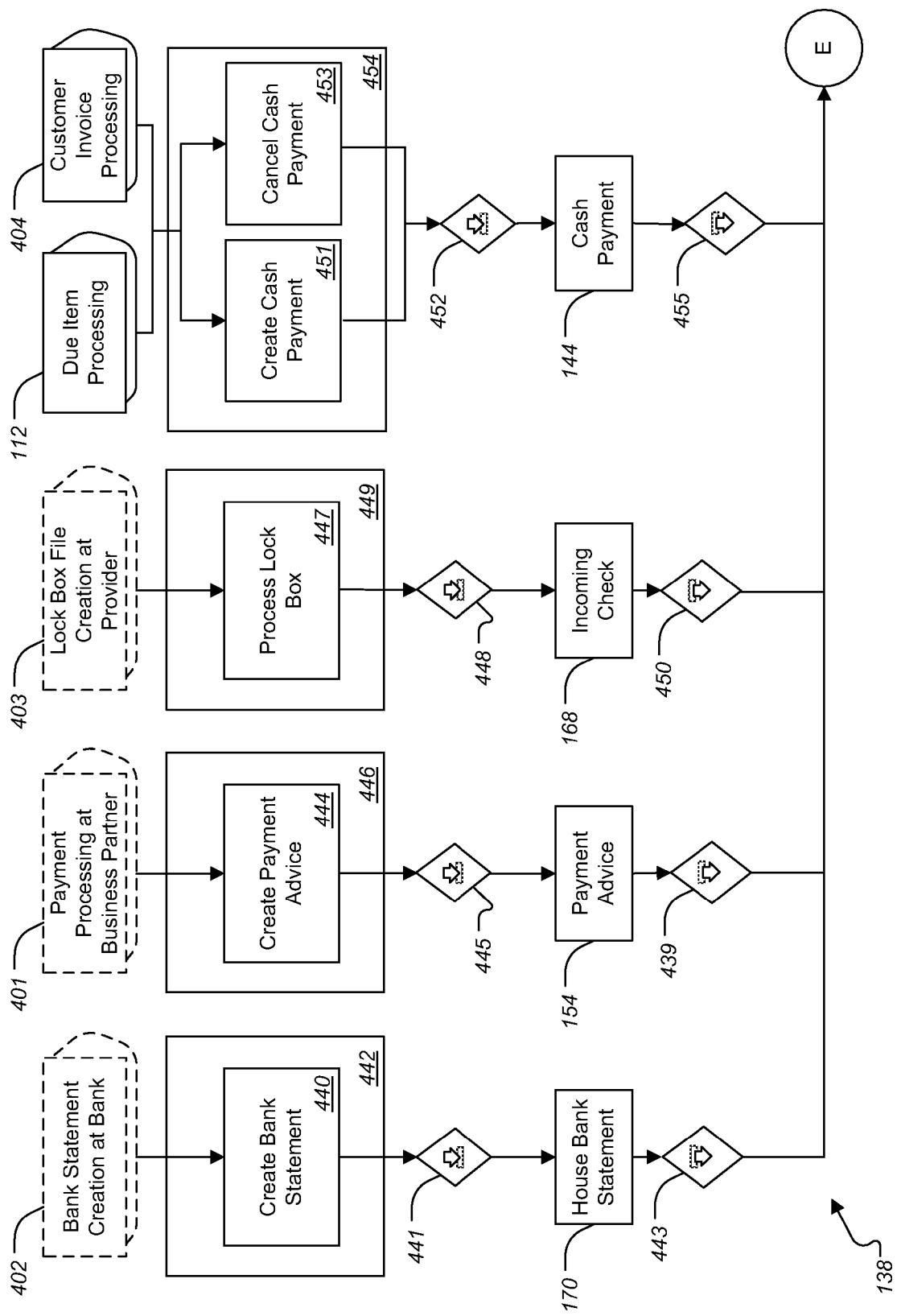
Figure 4D:
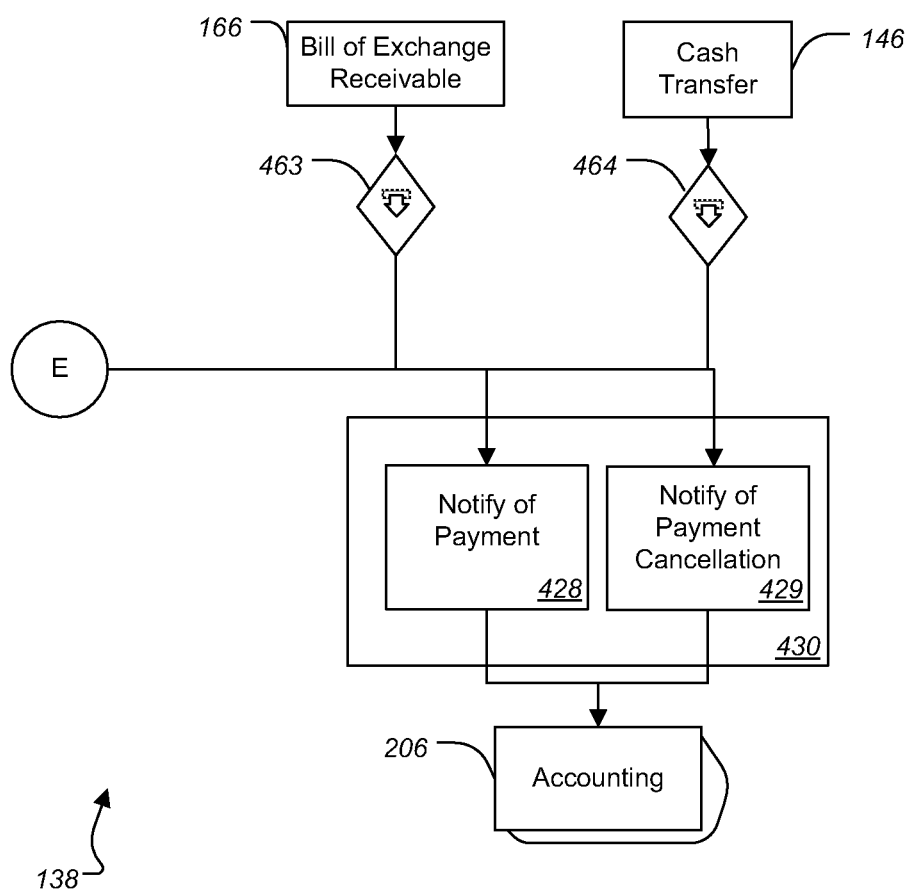

The Payment Order business object 148 can receive updated information and send the update into other components to perform further operations. As shown in FIGS. 4A, 4B, and 4D, multiple outbound process agents can receive information from the Payment Order business object 148.

A Confirm Payment Request from Payment Order to Due Item Processing asynchronous outbound process agent 421 can invoke a Confirm Payment Request operation 422. For example, the outbound process agent 421 can send a notification of a confirmed payment. The notification can be sent to the Payment Processing at Business Partner process component 401. The Confirm Payment Request operation 422 is included in a Payment Request Out interface 423.

A Notify of Payment from Payment Order to Business Partner asynchronous outbound process agent 424 can invoke a Notify of Payment operation 425. For example, the outbound process agent 424 can send a notification of a payment. The notification can be sent to the Payment Processing at Business Partner process component 401. The Notify of Payment operation 425 is included in an Outgoing Payment Advising Out interface 426.

A Notify of Payment from Payment Order to Accounting asynchronous outbound process agent 427 can invoke a Notify of Payment operation 428 (FIG. 4D). For example, the outbound process agent 427 can send a notification of a payment. The notification can be sent to the Accounting process component 206. The Notify of Payment from Payment Order to Accounting asynchronous outbound process agent 427 can also invoke a Notify of Payment Cancellation operation 429. For example, the outbound process agent 427 can send a notification of a payment cancellation. The notification can be sent to the Accounting process component 206. The Notify of Payment operation 428 and the Notify of Payment Cancellation operation 429 are included in a Payment Accounting Out interface 430.

A Change Payment Allocation based on Clearing Request Confirmation operation 431 can send a payment allocation change request using a Change Payment Allocation based on Clearing Request Confirmation asynchronous inbound process agent 432 to update the Payment Allocation business object 142. For example, the operation 431 can send a payment allocation change request to update the Payment Allocation business object 142 if input is received from the Due Item Processing process component 112. The Change Payment Allocation based on Clearing Request Confirmation operation 431 is included in a Clearing In interface 433.

The Payment Allocation business object 142 can receive updated information and send the update into other components to perform further operations. As shown in FIGS. 4A, 4B, and 4D, multiple outbound process agents can receive information from the Payment Allocation business object 142.

A Request Clearing Maintenance from Payment Allocation to Due Item Processing asynchronous outbound process agent 434 can invoke a Request Clearing operation 435. For example, the outbound process agent 434 can send a notification of a clearing request based on a payment allocation. The notification can be sent to the Due Item Processing process component 112. The Request Clearing Maintenance from Payment Allocation to Due Item Processing asynchronous outbound process agent 434 can also invoke a Request Clearing Cancellation operation 436. For example, the outbound process agent 434 can send a notification of a clearing request cancellation based on a payment allocation. The notification can be sent to the Due Item Processing process component 112. The Request Clearing operation 435 and the Request Clearing Cancellation operation 436 are included in a Clearing Out interface 437.

A Notify of Payment from Payment Allocation to Accounting asynchronous outbound process agent 438 can invoke the Notify of Payment operation 428. For example, the outbound process agent 438 can send a notification of a payment to accounting. The notification can be sent to the Accounting process component 206. The Notify of Payment from Payment Allocation to Accounting asynchronous outbound process agent 438 can also invoke the Notify of Payment Cancellation operation 429. For example, the outbound process agent 438 can send a notification of a payment cancellation to accounting. The notification can be sent to the Accounting process component 206.

The implementation of the Payment Processing process component 138 is further supported by the Payment Register business object 164, although no operations or process agents involving the business object 164 are explicitly shown in FIG. 4A. The Payment Register business object 164 represents the register of incoming and outgoing payments of a company that can be initiated by the company as well as by a business partner.

A Create Bank Statement operation 440 (FIG. 4C) can send a bank statement creation request using a Maintain Bank Statement asynchronous inbound process agent 441 to update the House Bank Statement business object 170. The House Bank Statement business object 170 can receive updated information and send the update into other components to perform further operations. For example, the operation 440 can send a bank statement creation request to update the House Bank Statement business object 170 if input is received from the Bank Statement Creation at Bank process component 402. The Create Bank Statement operation 440 is included in a Bank Statement Processing In interface 442. Multiple outbound process agents, including an outbound process agent 443, can receive information from the House Bank Statement business object 170.

A Notify of Payment from Bank Statement to Accounting asynchronous outbound process agent 443 can invoke the Notify of Payment operation 428 (FIG. 4D). For example, the outbound process agent 443 can send a notification of a payment to accounting. The notification can be sent to the Accounting process component 206. The Notify of Payment from Bank Statement to Accounting asynchronous outbound process agent 443 can also invoke the Notify of Payment Cancellation operation 429. For example, the outbound process agent 443 can send a notification of a payment cancellation to accounting. The notification can be sent to the Accounting process component 206. The Notify of Payment operation 428 and the Notify of Payment Cancellation operation 429 are included in the Payment Accounting Out interface 430.

A Create Payment Advice operation 444 can send a request to create a payment advice using a Maintain Payment Advice asynchronous inbound process agent 445 to update the Payment Advice business object 154. For example, the operation 444 can send a request to create a payment advice to update the Payment Advice business object 154 if input is received from the Payment Processing at Business Partner process component 401. The Create Payment Advice operation 444 is included in an Incoming Payment Advising In interface 446.

The Payment Advice business object 154 can receive updated information and send the update into other components to perform further operations. Multiple outbound process agents, including an outbound process agent 439, can receive information from the Payment Advice business object 154.

A Process Lock Box operation 447 can send a request to process a lock box using a Process Lock Box asynchronous inbound process agent 448 to update the Incoming Check business object 168. The Incoming Check business object 168 can receive updated information and send the update into other components to perform further operations. For example, the operation 447 can send a request to process a lock box to update the Incoming Check business object 168 if input is received from the Lock Box File Creation at Provider process component 403. The Process Lock Box operation 447 is included in a Lock Box Processing In interface 449. Multiple outbound process agents, including outbound process agent 450, can receive information from the Incoming Check business object 168.

A Notify of Payment from Incoming Check to Accounting asynchronous outbound process agent 450 can invoke the Notify of Payment operation 428 (FIG. 4D). For example, the outbound process agent 450 can send a notification of a payment to accounting. The notification can be sent to the Accounting process component 206. The Notify of Payment from Incoming Check to Accounting asynchronous outbound process agent 450 can also invoke the Notify of Payment Cancellation operation 429. For example, the outbound process agent 450 can send a notification of a payment cancellation to accounting. The notification can be sent to the Accounting process component 206. The Notify of Payment operation 428 and the Notify of Payment Cancellation operation 429 are included in the Payment Accounting Out interface 430.

A Create Cash Payment operation 451 can send a cash payment creation request using a Maintain Cash Payment asynchronous inbound process agent 452 to update the Cash Payment business object 144. For example, the operation 451 can send a cash payment creation request to update the Cash Payment business object 144 if input is received from the Customer Invoice Processing process component 404 or the Due Item Processing process component 112. A Cancel Cash Payment operation 453 can send a cash payment cancellation request, also using the Maintain Cash Payment asynchronous inbound process agent 452 to update the Cash Payment business object 144. For example, the operation 453 can send a cash payment cancellation request to update the Cash Payment business object 144 if input is received from the Customer Invoice Processing process component 404 or the Due Item Processing process component 112. The Create Cash Payment operation 451 and the Cancel Cash Payment operation 453 are included in a Cash Payment In interface 454.

The Cash Payment business object 144 can receive updated information and send the update into other components to perform further operations. Multiple outbound process agents, such as outbound process agent 455, can receive information from the Cash Payment business object 144.

A Notify of Payment from Cash Payment to Accounting asynchronous outbound process agent 455 can invoke the Notify of Payment operation 428 (FIG. 4D). For example, the outbound process agent 455 can send a notification of a payment to accounting. The notification can be sent to the Accounting process component 206. The Notify of Payment from Cash Payment to Accounting asynchronous outbound process agent 455 can also invoke the Notify of Payment Cancellation operation 429. For example, the outbound process agent 455 can send a notification of a payment cancellation to accounting. The notification can be sent to the Accounting process component 206. The Notify of Payment operation 428 and the Notify of Payment Cancellation operation 429 are included in the Payment Accounting Out interface 430.

The Bill of Exchange Receivable business object 166 can receive updated information and send the update into other components to perform further operations. Multiple outbound process agents can receive information from the Bill of Exchange Receivable business object 166, such as outbound process agent 463.

A Notify of Payment from Bill of Exchange Receivable to Accounting asynchronous outbound process agent 463 can invoke the Notify of Payment operation 428. For example, the outbound process agent 463 can send notification of a bill of exchange receivable. The notification can be sent to the Accounting process component 206. The Notify of Payment from Bill of Exchange Receivable to Accounting asynchronous outbound process agent 463 can also invoke the Notify of Payment Cancellation operation 429. For example, the outbound process agent 463 can send cancellation notification for a bill of exchange receivable. The notification can be sent to the Accounting process component 206. The Notify of Payment operation 428 and the Notify of Payment Cancellation operation 429 are included in the Payment Accounting Out interface 430.

The Cash Transfer business object 146 can receive updated information and send the update into other components to perform further operations. Multiple outbound process agents can receive information from the Cash Transfer business object 146, such as outbound process agent 464.

An asynchronous outbound process agent 464 can invoke the Notify of Payment operation 428. For example, the outbound process agent 464 can send notification of a cash transfer. The notification can be sent to the Accounting process component 206. The outbound process agent 464 can also invoke the Notify of Payment Cancellation operation 429. For example, the outbound process agent 464 can send cancellation notification for a cash transfer. The notification can be sent to the Accounting process component 206.

A Change Clearing House Payment Order based on Credit Card Settlement Confirmation operation 466 (FIG. 4E) can send a notification of a credit card settlement using a Change Clearing House Payment Order based on Credit Card Settlement Confirmation asynchronous inbound process agent 467 to update the Clearing House Payment Order business object 150. For example, the operation 466 can send notification of a credit card settlement to update the Clearing House Payment Order business object 150 if input is received from the Settlement Processing at Clearing House process component 407. The Change Clearing House Payment Order based on Credit Card Settlement Confirmation operation 466 is included in a Payment Card Payment Settling In interface 468.

The Clearing House Payment Order business object 150 can receive updated information and send the update into other components to perform further operations. Multiple outbound process agents can receive information from the Clearing House Payment Order business object 150, such as outbound process agent 470.

A Request Credit Card Settlement from Clearing House Payment Order to Clearing House asynchronous outbound process agent 470 can invoke a Request Payment Card Payment Settlement operation 471. For example, the outbound process agent 470 can send a notification of a credit card payment. The notification can be sent to the Settlement Processing at Clearing House process component 407. The Request Payment Card Payment Settlement operation 471 is included in a Payment Card Payment Settling Out interface 472.

Figure 4E:
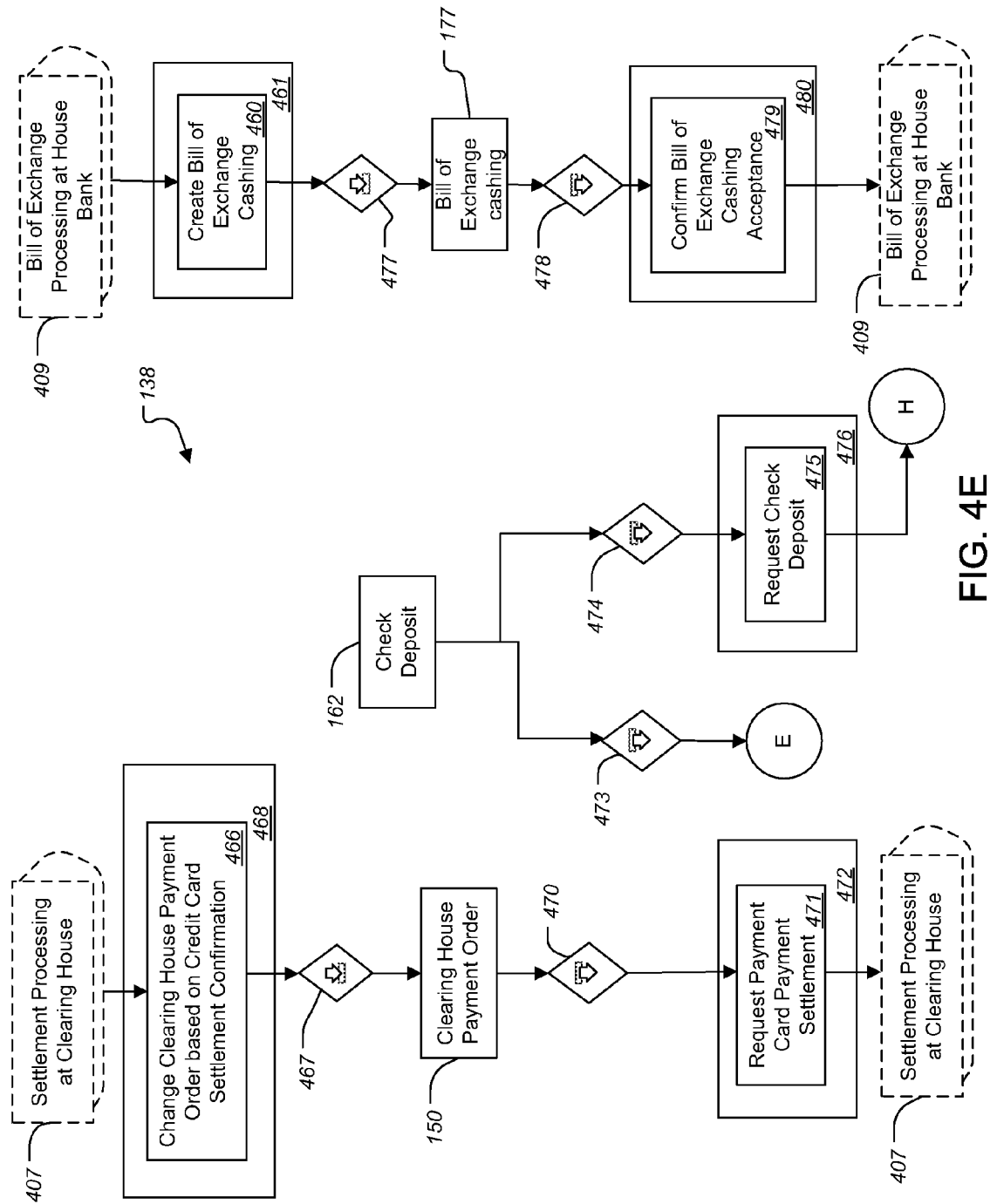

The Check Deposit business object 162 can receive updated information and send the update into other components to perform further operations. As shown in FIGS. 4D and 4E, multiple outbound process agents can receive information from the Check Deposit business object 162.

A Notify of Payment from Check Deposit to Accounting asynchronous outbound process agent 473 can invoke the Notify of Payment operation 428 (FIG. 4D). For example, the outbound process agent 473 can send a notification of check deposit. The notification can be sent to the Accounting process component 206. The Notify of Payment from Check Deposit to Accounting asynchronous outbound process agent 473 can also invoke the Notify of Payment Cancellation operation 429. For example, the outbound process agent 473 can send a cancellation notification of a check deposit. The notification can be sent to the Accounting process component 206.

Figure 4F:
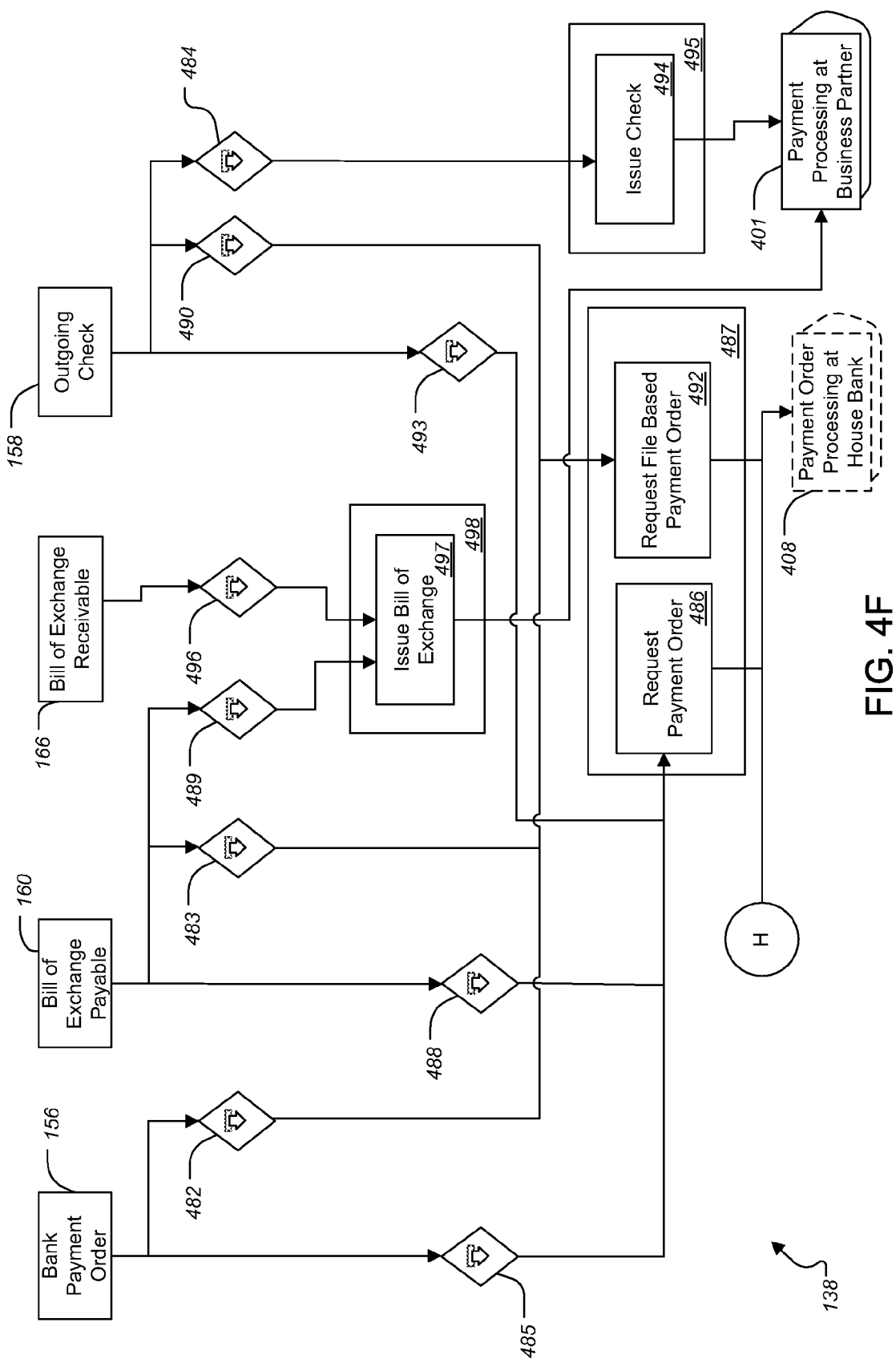

A Request Check Deposit from House Bank asynchronous outbound process agent 474 can invoke a Request Check Deposit operation 475. For example, the outbound process agent 474 can send a notification of a check deposit. The notification can be sent to the Payment Order Processing at House Bank process component 408 (FIG. 4F). The Request Check Deposit operation 475 is included in a Check Depositing Out interface 476.

A Create Bill of Exchange Cashing operation 460 can send a request to create a bill of exchange cashing using an asynchronous inbound process agent 477 to update the Bill of Exchange Cashing business object 177. For example, the operation 460 can send a request to create a bill of exchange cashing to update the Bill of Exchange Cashing business object 177 if input is received from the Bill of Exchange Processing at House Bank process component 409. The Create Bill of Exchange Cashing operation 460 is included in a Bill Of Exchange Cashing In interface 461.

The Bill of Exchange Cashing business object 177 can receive updated information and send the update into other components to perform further operations. Multiple outbound process agents can receive information from the Clearing House Payment Order business object 150, such as outbound process agent 478.

An asynchronous outbound process agent 478 can invoke a Confirm Bill of Exchange Cashing Acceptance operation 479. For example, the outbound process agent 478 can send a notification of a bill of exchange cashing acceptance. The notification can be sent to the Bill of Exchange Processing at House Bank process component 409. The Confirm Bill of Exchange Cashing Acceptance operation 479 is included in a Bill Of Exchange Cashing Out interface 480.

The Bank Payment Order business object 156 (FIG. 4F) can receive updated information and send the update into other components to perform further operations. As shown in FIG. 4F, multiple outbound process agents can receive information from the Bank Payment Order business object 156.

A Request Payment Order from Bank Payment Order to House Bank asynchronous outbound process agent 485 can invoke a Request Payment Order operation 486. For example, the outbound process agent 485 can send a notification of a bank payment order. The notification can be sent to the Payment Order Processing at House Bank process component 408. A Request File Based Payment Order from Bank Payment Order to House Bank asynchronous outbound process agent 482 can invoke a Request File Based Payment Order operation 492. For example, the outbound process agent 482 can send a request for a file based payment order. The notification can be sent to the Payment Order Processing at House Bank process component 408. The Request Payment Order operation 486 and the Request File Based Payment Order operation 492 are included in a Payment Ordering Out interface 487.

The Bill of Exchange Payable business object 160 can receive updated information and send the update into other components to perform further operations. As shown in FIG. 4F, multiple outbound process agents can receive information from the Bill of Exchange Payable business object 160.

A Request Payment Order from Bill of Exchange Payable to House Bank asynchronous outbound process agent 488 can invoke the Request Payment Order operation 486. For example, the outbound process agent 488 can send a notification of the bill of exchange payable. The notification can be sent to the Payment Order Processing at House Bank process component 408. A Request File Based Payment Order from Bill of Exchange Payable to House Bank asynchronous outbound process agent 483 can invoke a Request File Based Payment Order operation 492. For example, the outbound process agent 483 can send a request for a file based payment order. The notification can be sent to the Payment Order Processing at House Bank process component 408.

An asynchronous outbound process agent 489 can invoke an Issue Bill of Exchange operation 497. For example, the outbound process agent 489 can send a request to issue a bill of exchange payable using the Issue Bill of Exchange operation 497 included in a Bill Of Exchange Issuing Output Out interface 498. The request can then be sent to the Payment Processing at Business Partner process component 401.

The Bill of Exchange Receivable business object 166 can receive updated information and send the update into other components to perform further operations. Multiple outbound process agents can receive information from the Bill of Exchange Receivable business object 166, including outbound process agent 496.

An asynchronous outbound process agent 496 can invoke the Issue Bill of Exchange operation 497. For example, the outbound process agent 496 can send a request to issue a bill of exchange receivable. The request can be sent to the Payment Processing at Business Partner process component 401.

The Outgoing Check business object 158 can receive updated information and send the update into other components to perform further operations. As shown in FIG. 4F, multiple outbound process agents can receive information from the Outgoing Check business object 158.

A Request Payment Order from Outgoing Check to House Bank asynchronous outbound process agent 493 can invoke the Request Payment Order operation 486. For example, the outbound process agent 493 can send a notification of an outgoing check. A Request File Based Payment Order from Outgoing Check to House Bank asynchronous outbound process agent 490 can invoke a Request File Based Payment Order operation 492. For example, the outbound process agent 490 can send a request for a file based payment order. The notification can be sent to the Payment Order Processing at House Bank process component 408. Additionally, an asynchronous outbound process agent 484 can invoke an Issue Check operation 494. For example, the outbound process agent 484 can send a request to issue a check. The request can be sent to the Payment Processing at Business Partner process component 401. The Issue Check operation 494 is included in a Check Issuing Output Out interface 495.

FIGS. 5A, 5B, 5C, 5D, and 5E are block diagrams collectively showing the Due Item Processing process component 112 (FIG. 1B). For convenience in describing this process component, a number of other process components are shown in the figures; these other process components are not part of the process component being described. These other process components are the Migration Data Dispatching process component 410 (FIG. 5A), a Supplier Invoice Processing process component 508, the Customer Invoice Processing process component 404, the Expense and Reimbursement Management process component 102, the Cash Management process component 140, a Processing of European Community Sales List Report at Tax Authority process component 584 (FIG. 5B), a Processing of Product Tax Declaration at Tax Authority process component 512 (FIG. 5C), the Payment Processing process component 138, a Due Item Processing at Business process component 502 (FIG. 5D), a Processing of Withholding Tax Declaration process component 504, and the Accounting process component 206. These other process components are used to represent software external to the process component in describing its interactions with the external software; however, while the external software can be implemented as such process components, this is not required.

Figure 5A:
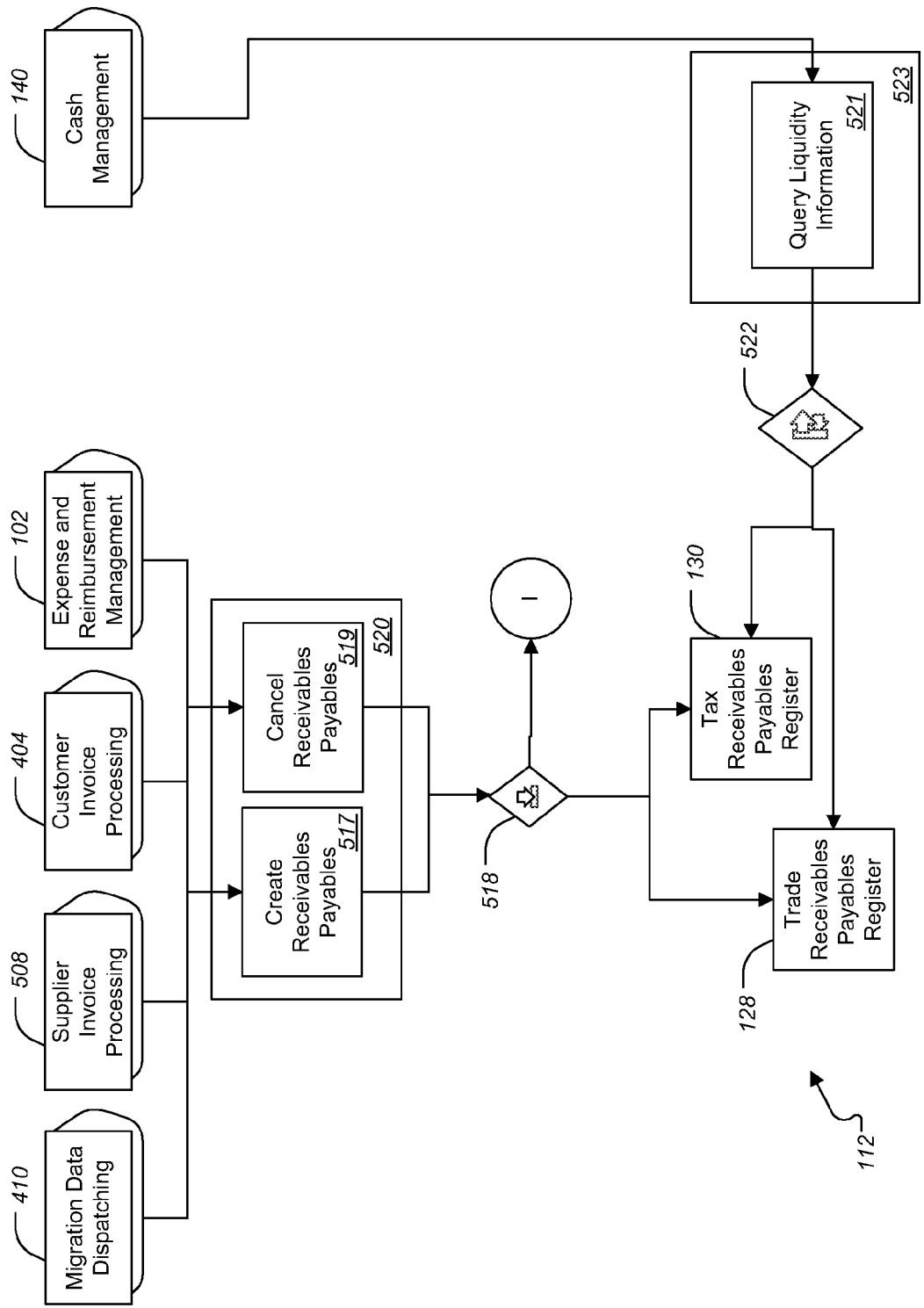
FIGS. 5A, 5B, 5C, 5D, and 5E are block diagrams collectively showing a due item processing process component.
Figure 5B:
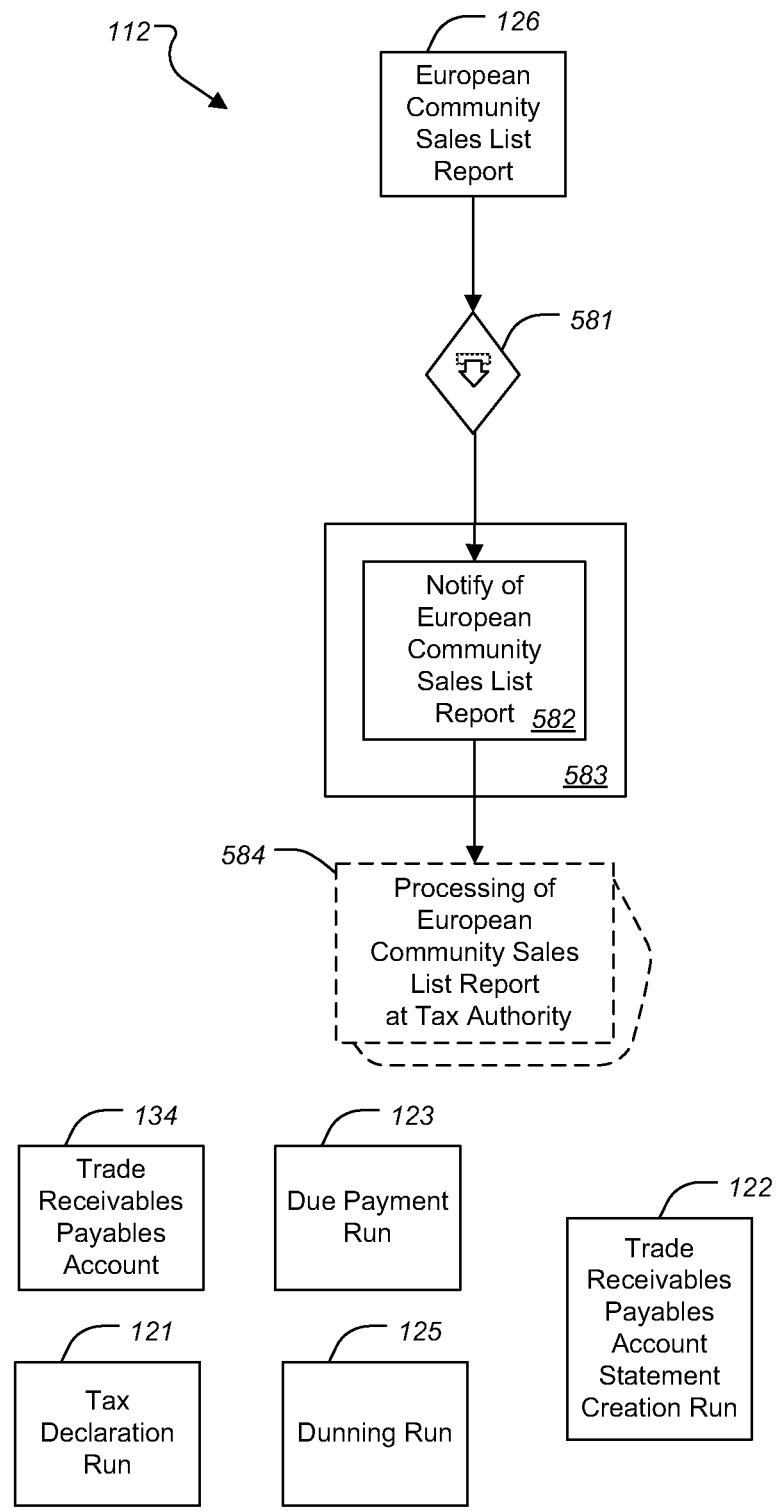
Figure 5C:
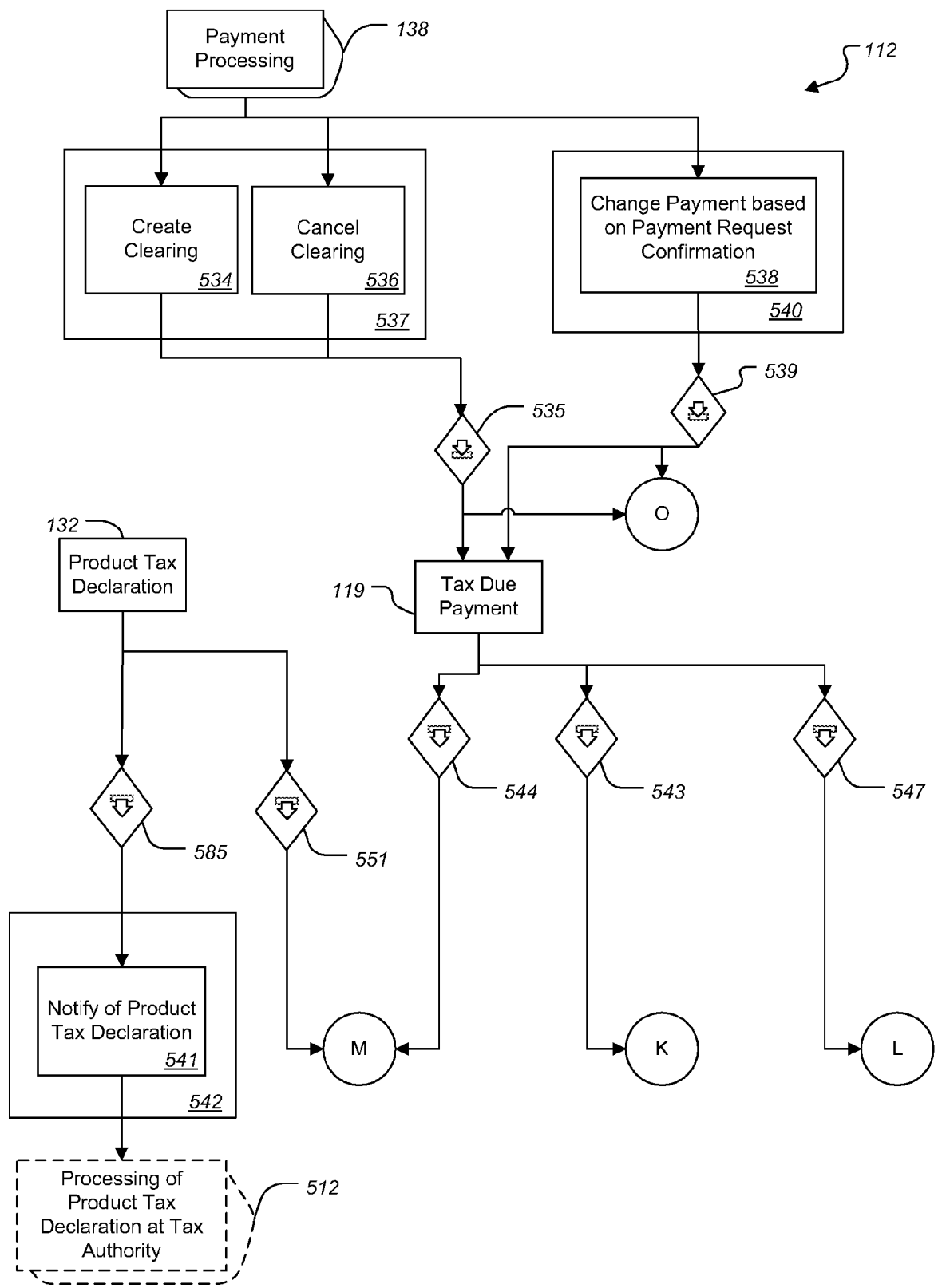
Figure 5D:
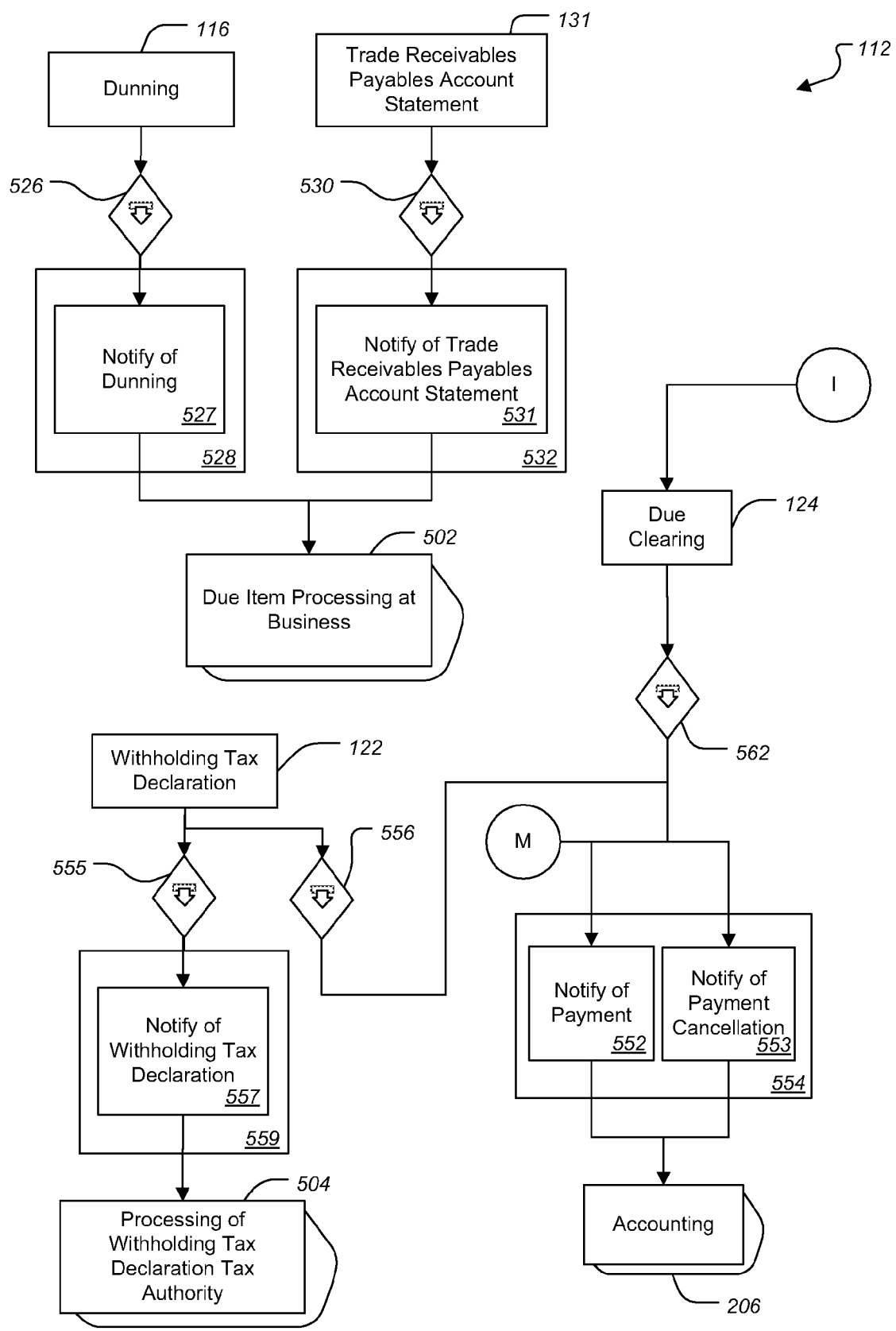

A Create Receivables Payables operation 517 can send a receivables or payables creation request using a Maintain Trade and Tax Receivables Payables asynchronous inbound process agent 518 to update three business objects: the Trade Receivables Payables Register business object 128, the Tax Receivables Payables Register business object 130, and the Due Clearing business object 124 (FIG. 5D). For example, the operation 517 can send a receivables or payables creation request to update to the business objects 128, 130 and 124 if input is received from any of several process components: the Migration Data Dispatching process component 410, the Supplier Invoice Processing process component 508, the Customer Invoice Processing process component 404, or the Expense and Reimbursement Management process component 102.

Similarly, a Cancel Receivables Payables operation 519 can send a receivables or payables cancellation request, also using the Maintain Trade and Tax Receivables Payables asynchronous inbound process agent 518 to update three business objects: the Trade Receivables Payables Register business object 128, the Tax Receivables Payables Register business object 130, and the Due Clearing business object 124. For example, the operation 519 can send a receivables or payables cancellation request to update the business objects 128, 130 and 124 if input is received from any of several process components: the Migration Data Dispatching process component 410, the Supplier Invoice Processing process component 508, the Customer Invoice Processing process component 404, or the Expense and Reimbursement Management process component 102. Both the Create Receivables Payables operation 517 and the Cancel Receivables Payables operation 519 are included in a Receivables Payables In interface 520.

A Query Liquidity Information operation 521 can send a liquidity information query using a Synchronous Get Liquidity Information from Due Item Processing synchronous inbound process agent 522 to query the Trade Receivables Payables Register business object 128 and the Tax Receivables Payables Register business object 130. For example, the operation 521 can send a liquidity information query to the business objects 128 and 130 if input is received from the Cash Management process component 140. The Query Liquidity Information operation 521 is included in a Liquidity Information In interface 523.

The European Community Sales List Report business object 126 can send updates into other components to perform further operations. As shown in FIG. 5B, an outbound process agent can receive information from the European Community Sales List Report business object 126. A Notify of European Community Sales List Report to Tax Authority asynchronous outbound process agent 581 can invoke a Notify of European Community Sales List Report operation 582. For example, the outbound process agent 581 can send a notification of a European community sales list report. The notification can be sent to the Processing of European Community Sales List Report at Tax Authority process component 584. The Notify of European Community Sales List Report operation 582 is included in a European Community Sales List Report Out interface 583.

Figure 5E:
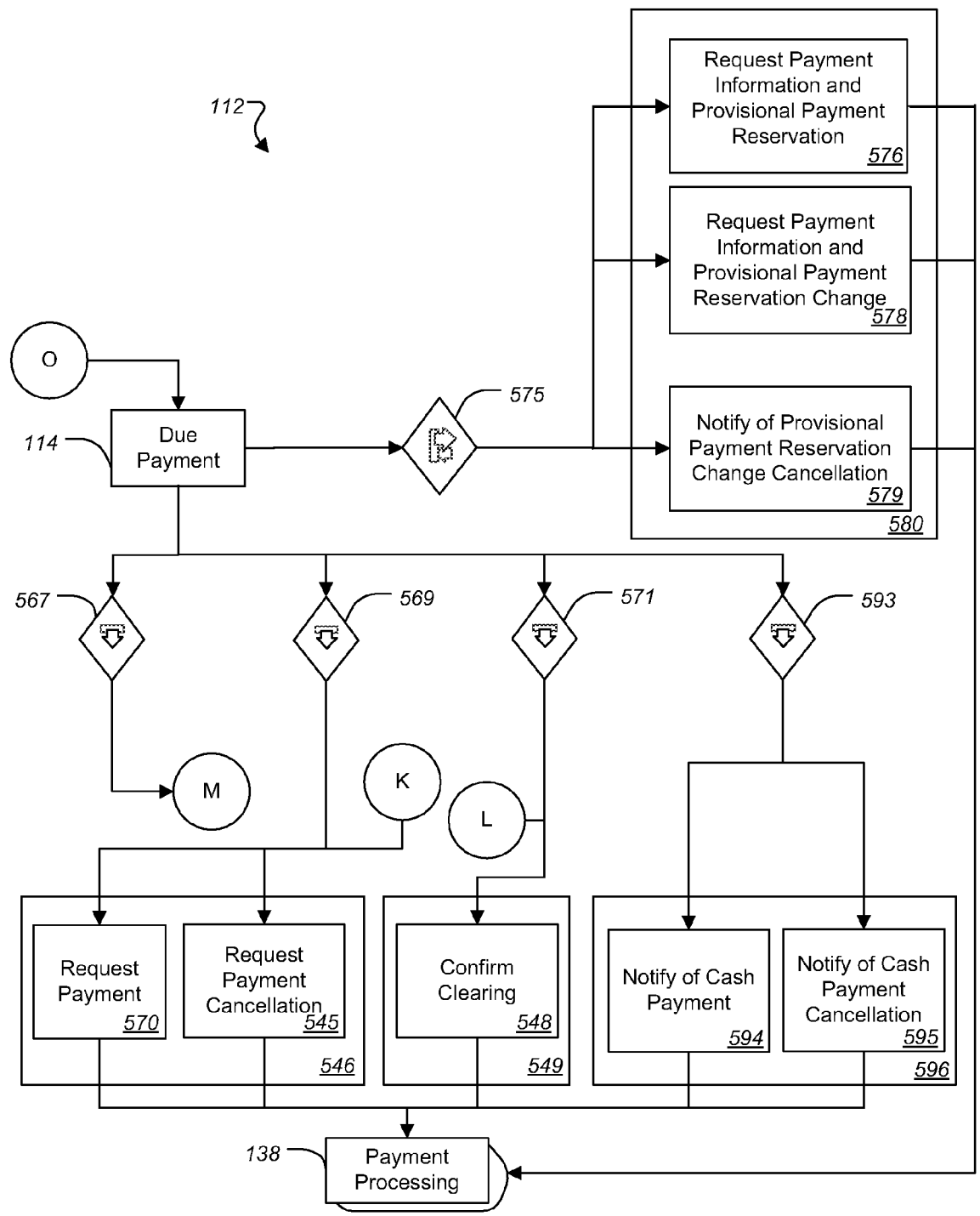

A Create Clearing operation 534 can send a create clearing request using a Maintain Clearing asynchronous inbound process agent 535 to update the Tax Due Payment business object 119 and the Due Payment business object 114 (FIG. 5E). For example, the operation 534 can send a create clearing request to update the Tax Due Payment business object 119 and the Due Payment business object 114 if input is received from the Payment Processing process component 138. A Cancel Clearing operation 536 can send a cancel clearing request, also using the Maintain Clearing asynchronous inbound process agent 535 to update the Tax Due Payment business object 119 and the Due Payment business object 114. For example, the operation 536 can send a cancel clearing request to update the Tax Due Payment business object 119 and the Due Payment business object 114 if input is received from the Payment Processing process component 138. The Create Clearing operation 534 and the Cancel Clearing operation 536 are included in a Clearing In interface 537.

A Change Payment based on Payment Request Confirmation operation 538 can send a payment change request using a Change Due Payment based on Payment Request Confirmation asynchronous inbound process agent 539 to update the Tax Due Payment business object 119 and the Due Payment business object 114. For example, the operation 539 can send a payment change request to update the Tax Due Payment business object 119 and the Due Payment business object 114 if input is received from the Payment Processing process component 138. The Change Payment based on Payment Request Confirmation operation 538 is included in a Payment Request In interface 540.

The Tax Due Payment business object 119 can receive updated information and send the update into other components to perform further operations. As shown in FIGS. 5C, 5D and 5E, multiple outbound process agents can receive information from the Tax Due Payment business object 119.

A Request Payment from Tax Due Payment to Payment Processing asynchronous outbound process agent 543 can invoke a Request Payment Cancellation operation 545 (FIG. 5E). For example, the outbound process agent 543 can send a notification of a payment cancellation request. The notification can be sent to the Payment Processing process component 138. The Request Payment from Tax Due Payment to Payment Processing asynchronous outbound process agent 543 can also invoke a Request Payment operation 570. For example, the outbound process agent 543 can send a notification of a payment request. The notification can be sent to the Payment Processing process component 138. Both the Request Payment Cancellation operation 545 and the Request Payment operation 570 are included in a Payment Request Out interface 546.

A Confirm Clearing from Tax Due Payment to Payment Processing asynchronous outbound process agent 547 can invoke a Confirm Clearing operation 548 (FIG. 5E). For example, the outbound process agent 547 can send a notification of clearing confirmation based on a product tax declaration. The notification can be sent to the Payment Processing process component 138. The Confirm Clearing operation 548 is included in a Clearing Out interface 549.

A Notify of Payment from Tax Due Payment to Accounting asynchronous outbound process agent 544 can invoke a Notify of Payment operation 552 (FIG. 5D). For example, the outbound process agent 544 can send a notification of a payment. The notification can be sent to the Accounting process component 206. The Notify of Payment from Tax Due Payment to Accounting asynchronous outbound process agent 544 can also invoke a Notify of Payment Cancellation operation 553. For example, the outbound process agent 544 can send a notification of a cancelled payment. The notification can be sent to the Accounting process component 206. The Notify of Payment operation 552 and the Notify of Payment Cancellation operation 553 are included in a Payment Accounting Out interface 554.

The Product Tax Declaration business object 132 can receive updated information and send the update into other components to perform further operations. As shown in FIGS. 5C and 5D, multiple outbound process agents can receive information from the Product Tax Declaration business object 132.

A Notify of Product Tax Declaration to Authority asynchronous outbound process agent 585 can invoke a Notify of Product Tax Declaration operation 541. For example, the outbound process agent 585 can send a notification of a product tax declaration. The notification can be sent to the Processing of Product Tax Declaration at Tax Authority process component 512. The Notify of Product Tax Declaration operation 541 is included in a Product Tax Declaration Out interface 542.

Notify of Payment from Product Tax Declaration to Accounting asynchronous outbound process agent 551 can invoke the Notify of Payment operation 552 (FIG. 5D). For example, the outbound process agent 551 can send a notification of a payment. The notification can be sent to the Accounting process component 206. The Notify of Payment from Product Tax Declaration to Accounting asynchronous outbound process agent 551 can also invoke the Notify of Payment Cancellation operation 553. For example, the outbound process agent 551 can send a notification of a cancelled payment. The notification can be sent to the Accounting process component 206. The Notify of Payment operation 552 and the Notify of Payment Cancellation operation 553 are included in a Payment Accounting Out interface 554.

The Due Clearing business object 124 can receive updated information and send the update into other components to perform further operations. As shown in FIG. 5D, an outbound process agent can receive information from the Due Clearing business object 124.

A Notify of Payment from Due Clearing to Accounting asynchronous outbound process agent 562 can invoke the Notify of Payment operation 552. For example, the outbound process agent 562 can send a notification of a cleared payment. The notification can be sent to the Accounting process component 206. The Notify of Payment from Due Clearing to Accounting asynchronous outbound process agent 562 can also invoke both the Notify of Payment operation 552 and the Notify of Payment Cancellation operation 553. For example, the outbound process agent 562 can send a notification of a payment or of a cancelled payment. The notification can be sent to the Accounting process component 206.

The Withholding Tax Declaration business object 122 can receive updated information and send the update into other components to perform further operations. As shown in FIG. 5D, an outbound process agent can receive information from the Withholding Tax Declaration business object 122.

An asynchronous outbound process agent 555 can invoke a Notify of Withholding Tax Declaration operation 557. For example, the outbound process agent 555 can send a notification of a withholding tax declaration. The notification can be sent to the Processing of Withholding Tax Declaration Tax Authority process component 504. The Notify of Withholding Tax Declaration operation 557 is included in a Withholding Tax Declaration Out interface 559.

A Notify of Payment from Withholding Tax Declaration to Accounting asynchronous outbound process agent 556 can invoke the Notify of Payment operation 552. For example, the outbound process agent 556 can send a notification of a withholding tax declaration payment. The notification can be sent to the Accounting process component 206. The Notify of Payment from Withholding Tax Declaration to Accounting asynchronous outbound process agent 556 can also invoke the Notify of Payment Cancellation operation 553. For example, the outbound process agent 556 can send a notification of a cancelled payment. The notification can be sent to the Accounting process component 206.

The Dunning business object 116 can receive updated information and send the update into other components to perform further operations. As shown in FIG. 5D, an outbound process agent can receive information from the Dunning business object 116. An asynchronous outbound process agent 526 can invoke a Notify of Dunning operation 527. For example, the outbound process agent 526 can send a notification of a dunning. The notification can be sent to the Due Item Processing at Business process component 502. The Notify of Dunning operation 527 is included in a Dunning Output Out interface 528.

The Trade Receivables Payables Account Statement business object 131 can receive updated information and send the update into other components to perform further operations. As shown in FIG. 5D, an outbound process agent can receive information from the Trade Receivables Payables Account Statement business object 131. An asynchronous outbound process agent 530 can invoke a Notify of Trade Receivables Payables Account Statement operation 531. For example, the outbound process agent 530 can send a notification of a trade receivables payables account statement. The notification can be sent to the Due Item Processing at Business process component 502. The Notify of Trade Receivables Payables Account Statement operation 531 is included in a Trade Receivables Payables Account Statement Out interface 532.

The Due Payment business object 114 can receive updated information and send the update into other components to perform further operations. As shown in FIG. 5E, multiple outbound process agents can receive information from the Due Payment business object 114.

A Notify of Payment from Due Payment to Accounting asynchronous outbound process agent 567 can invoke the Notify of Payment operation 552. For example, the outbound process agent 567 can send a notification of a payment received in due processing. The notification can be sent to the Accounting process component 206. The Notify of Payment from Due Payment to Accounting asynchronous outbound process agent 567 can also invoke the Notify of Payment Cancellation operation 553. For example, the outbound process agent 562 can send a notification of a cancelled payment. The notification can be sent to the Accounting process component 206.

A Request Payment from Due Payment to Payment Processing asynchronous outbound process agent 569 can invoke a Request Payment operation 570. For example, the outbound process agent 569 can send a request for a payment. The notification can be sent to the Payment Processing process component 138. The Request Payment from Due Payment to Payment Processing asynchronous outbound process agent 569 can also invoke the Request Payment Cancellation operation 545. For example, the outbound process agent 569 can send a notification of a payment cancellation request. The notification can be sent to the Payment Processing process component 138. The Request Payment operation 570 and the Request Payment Cancellation operation 545 are included in the Payment Request Out interface 546.

A Confirm Clearing from Due Payment to Payment Processing asynchronous outbound process agent 571 can invoke the Confirm Clearing operation 548. For example, the outbound process agent 571 can send a notification of a payment that cleared to due payment. The notification can be sent to the Payment Processing process component 138. The Confirm Clearing operation 548 is included in the Clearing Out interface 549.

A Notify of Cash Payment from Due Payment to Payment Processing asynchronous outbound process agent 593 can invoke the Notify of Cash Payment operation 594. For example, the outbound process agent 593 can send a notification of a cash payment that cleared to due payment. The notification can be sent to the Payment Processing process component 138. The Notify of Cash Payment from Due Payment to Payment Processing asynchronous outbound process agent 593 can also invoke the Request Cash Payment Cancellation operation 595. For example, the outbound process agent 593 can send a request to cancel a cash payment. The request can be sent to the Payment Processing process component 138. The Notify of Cash Payment operation 594 and the Request Cash Payment Cancellation operation 595 are included in the Cash Payment Out interface 596.

A Synchronous Request Payment Reservation from Due Payment to Payment Processing synchronous outbound process agent 575 can invoke a Request Payment Information and Provisional Payment Reservation operation 576. For example, the outbound process agent 575 can send a request for payment information and a provisional payment reservation. The request can be sent to the Payment Processing process component 138.

The Synchronous Request Payment Reservation from Due Payment to Payment Processing synchronous outbound process agent 575 can also invoke a Request Payment Information and Provisional Payment Reservation Change operation 578. For example, the outbound process agent 575 can send a request for payment information and a provisional payment reservation change. The request can be sent to the Payment Processing process component 138.

The Synchronous Request Payment Reservation from Due Payment to Payment Processing synchronous outbound process agent 575 can also invoke a Notify of Provisional Payment Reservation Change Cancellation operation 579. For example, the outbound process agent 575 can send a notification of a provisional payment reservation change deletion or cancellation. The notification can be sent to the Payment Processing process component 138.

The Request Payment Information and Provisional Payment Reservation operation 576, the Request Payment Information and Provisional Payment Reservation Change operation 578, and the Notify of Provisional Payment Reservation Change Deletion operation 579 are included in a Payment Request Out interface 580.

The implementation of the Due Item Processing process component 112 is further supported by several business objects, although no operations or process agents involving the business objects are explicitly shown in FIG. 5B. These business objects are the Tax Declaration Run business object 121, the Trade Receivables Payables Account business object 134, the Due Payment Run business object 123, the Dunning Run business object 125, and the Trade Receivables Payables Account Statement Creation Run business object 122.

Figure 6:
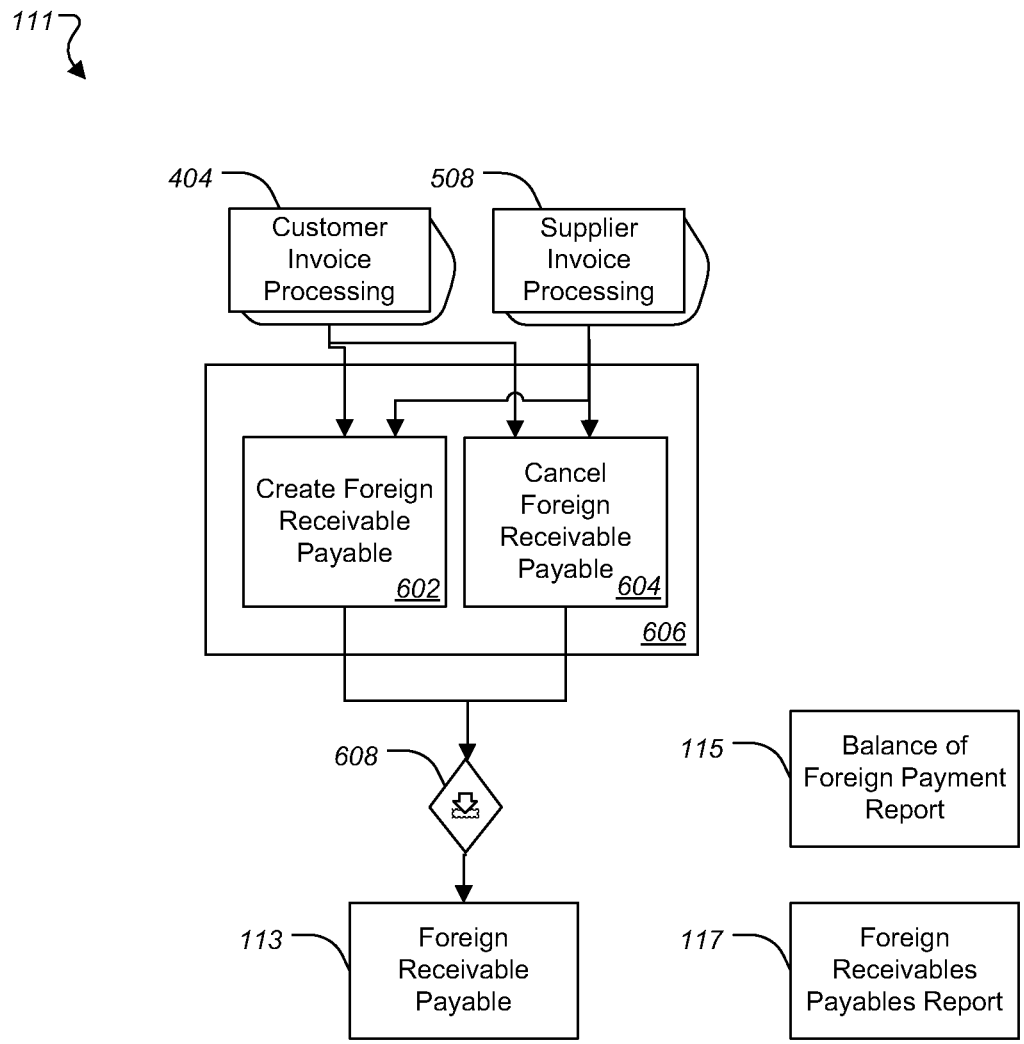
FIG. 6 is a block diagram showing a balance of foreign payment management process component.

FIG. 6 is a block diagram showing the Balance of Foreign Payment Management process component 111 (FIG. 1B). For convenience in describing this process component, a number of other process components are shown in the figures; these other process components are not part of the process component being described. These other process components are the Customer Invoice Processing process component 404 and the Supplier Invoice Processing process component 508. These other process components are used to represent software external to the process component in describing its interactions with the external software; however, while the external software can be implemented as such process components, this is not required.

A Create Foreign Receivable Payable operation 602 can create a foreign receivable or payable using a an asynchronous inbound process agent 608 to update the Foreign Receivable Payable business object 113. For example, the operation 602 can send a foreign receivable payable creation request to update the Foreign Receivable Payable business object 113 if input is received from the Customer Invoice Processing process component 404 or the Supplier Invoice Processing process component 508. A Cancel Foreign Receivable Payable operation 604 can cancel a foreign receivable payable, also using the inbound process agent 608 to update the Foreign Receivable Payable business object 113. For example, the operation 604 can send a foreign receivable payable cancellation request to update the Foreign Receivable Payable business object 113 if input is received from the Customer Invoice Processing process component 404 or the Supplier Invoice Processing process component 508. The Create Foreign Receivable Payable operation 602 and the Cancel Foreign Receivable Payable operation 604 are included in a Foreign Receivable Payable Notification In interface 606.

The Foreign Receivable Payable business object 113 can receive updated information and send the update into other components to perform further operations.

The implementation of the Balance of Foreign Payment Management process component 111 is further supported by several business objects, although no operations or process agents involving the business objects are explicitly shown in FIG. 6. These business objects are the Balance of Foreign Payment Report business object 115 and the Foreign Receivables Payables Report business object 117.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A system comprising:
a computer system comprising one or more hardware platforms for executing computer software; and
computer software encoded on the computer system for execution by one or more processors, the computer software implementing a plurality of service operations, the service operations comprising:
   a notify of project expense operation operable to send a notification of project expense;
   a first notify of settlement result cancellation operation operable to send a notification of a cancellation of an expense report relating to a receivables payables out interface;
   a second notify of settlement result cancellation operation operable to send a notification of a cancellation of settlement results relating to an expense report in payroll input maintenance out interface;
   a third notify of settlement result cancellation operation operable to send a notification of a cancellation of an expense report relating to an expense accounting out interface;
   a first notify of settlement result operation operable to send a notification of a settlement result relating to an expense report in payroll input maintenance out interface;
   a second notify of settlement result operation operable to send a notification of a settlement result relating to a receivables payables out interface;
   a third notify of settlement result operation operable to send a notification of a settlement result relating to an expense accounting out interface;
   a notify of product tax declaration operation operable to send a VAT declaration;
   a cancel receivables payables operation operable to cancel a trade or tax receivable or payable;
   a create receivables payables operation operable to create a trade or tax receivable or payable;
   a cancel clearing operation operable to cancel a previously sent clearing request;
   a notify of European community sales list report operation operable to send a European community sales list report;
   a request payment cancellation operation operable to cancel a payment;
   a notify of payment cancellation operation operable to send a notification of a payment or clearing cancellation;
   a request payment information and provisional payment reservation change operation operable to send a request for payment information with a change of provisional reservation of money;
   a request payment operation operable to send a request for payment;
   a notify of trade receivables payables account statement operation operable to send a notification of receivables and payables on a business partners account;
   a confirm clearing operation operable to send a confirmation for a clearing request;
   a request payment information and provisional payment reservation operation operable to send a request for payment information with a provisional reservation of money;
   a query liquidity information operation operable to obtain liquidity information;
   a notify of withholding tax declaration operation operable to send a withholding tax declaration;
   a create clearing operation operable to create a clearing for business partner-initiated payments;
   a notify of dunning operation operable to send a notification of outstanding payments;
   a notify of provisional payment reservation change cancellation operation operable to register the change of a provisional payment to the last transactional or saved state;
   a change payment based on payment request confirmation operation operable to confirm the execution of a payment request or a payment request cancellation;
   a notify of payment operation operable to send a notification about payments or clearings of trade and tax receivables or payables;
   a cancel foreign receivable payable operation operable to send a cancellation of a foreign receivable or payable; and
   a create foreign receivable payable operation operable to create a foreign receivable or payable.

2. The system of claim 1, wherein the service operations further comprise:
   a confirm bill of exchange cashing acceptance operation operable to accept a bill of exchange cashing;
   an issue bill of exchange operation operable to send a request for the issuing of a bill of exchange;
   a request clearing cancellation operation operable to cancel a previously sent clearing request;
   a create incoming check operation operable to create incoming checks;
   a request check deposit operation operable to send a request for the deposit of a collection of incoming checks;
   a request clearing operation operable to send a request for the clearing of payments;
   an issue check operation operable to send a request for the issuing of a check;
   a create bill of exchange cashing operation operable to create a bill of exchange cashing;
   a confirm payment request operation operable to confirm the execution of a payment in response to a payment request;
   a notify of payment operation operable to send a notification of cash receipts and cash disbursements;
   a request bill of exchange deposit operation operable to send a request for the deposit of a collection of bills of exchange receivables;
   a notify of payment cancellation operation operable to send a notification of the cancellation of cash receipts and cash disbursements;
   a create payment order operation operable to create a request for payment;
   a create payment advice operation operable to create a payment advice;
   a change clearing house payment order based on settlement confirmation operation operable to update the status of a clearing house payment order;
   a create bank statement operation operable to create a bank statement;
   a change payment allocation based on clearing request confirmation operation operable to confirm the execution or rejection of a sent clearing request;
   a request payment card payment settlement operation operable to send a collection of payment card payments;

a create payment reservation operation operable to check and determine payment data and create a reservation of payment;

a notify of payment operation operable to send data that allows the assignment of payments to receivables or payables;

a request file based payment order operation operable to instruct a house bank via file to make a bank transfer or a direct debit;

a change payment reservation operation operable to change a reservation of payment;

an issue bill of exchange operation operable to send a request for the issuing of a bill of exchange;

a cancel payment order operation operable to cancel a previously sent payment request by reference;

a sync change payment reservation operation operable to change a reservation of payment and confirm the change; and a query liquidity information operation operable to query liquidity information from relevant process components.

3. The system of claim 1, wherein the service operations are grouped into service interfaces, the service interfaces comprising:

a bill of exchange cashing in interface that includes the create bill of exchange cashing service operation;

a bill of exchange cashing out interface that includes the confirm bill of exchange cashing acceptance service operation;

a bill of exchange depositing out interface that includes the request bill of exchange deposit service operation;

a bill of exchange payable issuing output out interface that includes the issue bill of exchange service operation;

a bill of exchange receivable issuing output out interface that includes the issue bill of exchange service operation;

a check depositing output out interface that includes the request check deposit service operation;

a check issuing output out interface that includes the issue check service operation;

a clearing in interface that includes the change payment allocation based on clearing request confirmation, the cancel clearing, and the request clearing cancellation service operations;

a clearing out interface that includes the request clearing cancellation, the request clearing, and the confirm clearing service operations;

a dunning output out interface that includes the notify of dunning service operation;

a European community sales list report out interface that includes the notify of European community sales list report service operation;

an expense accounting out interface that includes the notify of settlement result and the notify of settlement result cancellation service operations;

an expense report in payroll input maintenance out interface that includes the notify of settlement result and the notify of settlement result cancellation service operations;

a foreign receivable payable notification in interface that includes the create foreign receivable payable and the cancel foreign receivable payable service operations;

an incoming check processing in interface that includes the create incoming check service operation;

an incoming payment advising in interface that includes the create payment advice service operation;

a liquidity information in interface that includes the query liquidity information service operation;

a liquidity information out interface that includes the notify of project expense and the query liquidity information service operations;

an outgoing payment advising out interface that includes the notify of payment service operation;

a payment accounting out interface that includes the notify of payment and the notify of payment cancellation service operations;

a payment card payment settling in interface that includes the change clearing house payment order based on settlement confirmation service operation;

a payment card payment settling out interface that includes the request payment card payment settlement service operation;

a payment ordering out interface that includes the request file based payment order service operation;

a payment request in interface that includes the create payment order, the create payment reservation, the change payment reservation, the cancel payment order, the sync change payment reservation, and the change payment based on payment request confirmation service operations;

a payment request out interface that includes the confirm payment request, the request payment cancellation, the request payment information and provisional payment reservation change, the request payment, the request payment information and provisional payment, and the notify of provisional payment reservation change cancellation service operations;

a payment processing incoming payment advising in interface that includes the create bank statement service operation;

a product tax declaration out interface that includes the notify of product tax declaration service operation;

a receivables payables in interface that includes the cancel receivables payables and the create receivables payables service operations;

a receivables payables out interface that includes the notify of settlement result cancellation and the notify of settlement result service operations;

a trade receivables payables account statement out interface that includes the notify of trade receivables payables account statement service operation; and a withholding tax declaration out interface that includes the notify of withholding tax declaration service operation.

4. The system of claim 1, wherein:

the computer software implementing the confirm bill of exchange cashing acceptance, the issue bill of exchange, the request clearing cancellation, the create incoming check, the request check deposit, the request clearing, the issue check, the create bill of exchange cashing, the confirm payment request, the notify of payment, the request bill of exchange deposit, the notify of payment cancellation, the create payment order, the create payment advice, the change clearing house payment order based on settlement confirmation, the create bank statement, the change payment allocation based on clearing request confirmation, the request payment card payment settlement, the create payment reservation, the notify of payment, the request file based payment order, the change payment reservation, the issue bill of exchange, the cancel payment order, the sync change payment reservation, and the query liquidity information operations is deployed on a first hardware platform;

the computer software implementing the notify of project expense, the notify of settlement result cancellation, and the notify of settlement result operations is deployed on a second hardware platform; and the computer software implementing the notify of product tax declaration, the cancel receivables payables, the create receivables payables, the cancel clearing, the notify of European community sales list report, the request payment cancellation, the notify of payment cancellation, the request payment information and provisional payment reservation change, the request payment, the notify of trade receivables payables account statement, the confirm clearing, the request payment information and provisional payment reservation, the query liquidity information, the notify of withholding tax declaration, the create clearing, the notify of dunning, the notify of provisional payment reservation change cancellation, the change payment based on payment request confirmation, the notify of payment, the cancel foreign receivable payable, and the create foreign receivable payable operations is deployed on a third hardware platform.

5. The system of claim 4, wherein each of the first through the third hardware platforms are distinct and separate from each other.

6. The system of claim 1, wherein:

the computer software implementing the confirm bill of exchange cashing acceptance, the issue bill of exchange, the request clearing cancellation, the create incoming check, the request check deposit, the request clearing, the issue check, the create bill of exchange cashing, the confirm payment request, the notify of payment, the request bill of exchange deposit, the notify of payment cancellation, the create payment order, the create payment advice, the change clearing house payment order based on settlement confirmation, the create bank statement, the change payment allocation based on clearing request confirmation, the request payment card payment settlement, the create payment reservation, the notify of payment, the request file based payment order, the change payment reservation, the issue bill of exchange, the cancel payment order, the sync change payment reservation, and the query liquidity information operations is deployable on a first hardware platform;

the computer software implementing the notify of project expense, the notify of settlement result cancellation, and the notify of settlement result operations is deployable on a second hardware platform;

the computer software implementing the notify of product tax declaration, the cancel receivables payables, the create receivables payables, the cancel clearing, the notify of European community sales list report, the request payment cancellation, the notify of payment cancellation, the request payment information and provisional payment reservation change, the request payment, the notify of trade receivables payables account statement, the confirm clearing, the request payment information and provisional payment reservation, the query liquidity information, the notify of withholding tax declaration, the create clearing, the notify of dunning, the notify of provisional payment reservation change cancellation, the change payment based on payment request confirmation, the notify of payment, the cancel foreign receivable payable, and the create foreign receivable payable operations is deployable on a third hardware platform;

the first through the third hardware platforms being distinct and separate from each other.

7. The system of claim 1, wherein the computer software deployed on the computer system comprises:

a plurality of process components, each of the process components being a package of software deployed and executing on the computer system and implementing a respective and distinct business process, the plurality of process components including:

a payment processing process component used to process and manage payments;

a cash management process component used for the analysis and the management of the actual and future flow of money;

an expense and reimbursement management process component used to expense and reimburse;

a dues item processing process component used to manage payables and receivables from service and supply and corresponding sales and withholding; and a balance of foreign payment management process components used to manage the collection, processing, and reporting of receivables and payables according to foreign trade regulations; and wherein:

the payment processing process component implements the confirm bill of exchange cashing acceptance, the issue bill of exchange, the request clearing cancellation, the create incoming check, the request check deposit, the request clearing, the issue check, the create bill of exchange cashing, the confirm payment request, the notify of payment, the request bill of exchange deposit, the notify of payment cancellation, the create payment order, the create payment advice, the change clearing house payment order based on settlement confirmation, the create bank statement, the change payment allocation based on clearing request confirmation, the request payment card payment settlement, the create payment reservation, the notify of payment, the request file based payment order, the change payment reservation, the issue bill of exchange, the cancel payment order, and the sync change payment reservation service operations;

the cash management process component implements the query liquidity information service operation;

the expense and reimbursement management process component implements the notify of project expense, the notify of settlement result cancellation, and the notify of settlement result service operations;

the due item processing process component implements the notify of product tax declaration, the cancel receivables payables, the create receivables payables, the cancel clearing, the notify of European community sales list report, the request payment cancellation, the notify of payment cancellation, the request payment information and provisional payment reservation change, the request payment, the notify of trade receivables payables account statement, the confirm clearing, the request payment information and provisional payment reservation, the query liquidity information, the notify of withholding tax declaration, the create clearing, the notify of dunning, the notify of provisional payment reservation change cancellation, the change payment based on payment request confirmation, and the notify of payment service operations; and the balance of foreign payment management process component implements the cancel foreign receivable payable and the create foreign receivable payable service operations.

8. The system of claim 1, wherein the computer software deployed on the computer system comprises:

a plurality of deployment units, each of the deployment units being a package of software packaged together to be deployed on a single physical hardware platform, the plurality of deployment units including:
- a payment deployment unit to process payment information;
- an expense and reimbursement management deployment unit to process an arrangement made by a company for an employee for expense reporting; and
- a due item management deployment unit to process due payment and receivables; and wherein:

the payment deployment unit implements the confirm bill of exchange cashing acceptance, the issue bill of exchange, the request clearing cancellation, the create incoming check, the request check deposit, the request clearing, the issue check, the create bill of exchange cashing, the confirm payment request, the notify of payment, the request bill of exchange deposit, the notify of payment cancellation, the create payment order, the create payment advice, the change clearing house payment order based on settlement confirmation, the create bank statement, the change payment allocation based on clearing request confirmation, the request payment card payment settlement, the create payment reservation, the notify of payment, the request file based payment order, the change payment reservation, the issue bill of exchange, the cancel payment order, the sync change payment reservation, and the query liquidity information service operations;

the expense and reimbursement management deployment unit implements the notify of project expense, the notify of settlement result cancellation, and the notify of settlement result service operations; and the due item management deployment unit implements the notify of product tax declaration, the cancel receivables payables, the create receivables payables, the cancel clearing, the notify of European community sales list report, the request payment cancellation, the notify of payment cancellation, the request payment information and provisional payment reservation change, the request payment, the notify of trade receivables payables account statement, the confirm clearing, the request payment information and provisional payment reservation, the query liquidity information, the notify of withholding tax declaration, the create clearing, the notify of dunning, the notify of provisional payment reservation change cancellation, the change payment based on payment request confirmation, the notify of payment, the cancel foreign receivable payable, and the create foreign receivable payable service operations.

9. The system of claim 1, further comprising a repository of service descriptions, the repository including a standards-based description of each of the plurality of service operations.

10. A computer program product encoded on a tangible computer-readable medium for implementing a plurality of services, the product comprising computer software operable to implement on a computer system services operations, the services operations comprising:
- a notify of project expense operation operable to send a notification of project expense;
- a first notify of settlement result cancellation operation operable to send a notification of a cancellation of an expense report relating to a receivables payables out interface;
- a second notify of settlement result cancellation operation operable to send a notification of a cancellation of settlement results relating to an expense report in payroll input maintenance out interface;
- a third notify of settlement result cancellation operation operable to send a notification of a cancellation of an expense report relating to an expense accounting out interface;
- a first notify of settlement result operation operable to send a notification of a settlement result relating to an expense report in payroll input maintenance out interface;
- a second notify of settlement result operation operable to send a notification of a settlement result relating to a receivables payables out interface;
- a third notify of settlement result operation operable to send a notification of a settlement result relating to an expense accounting out interface;
- a notify of product tax declaration operation operable to send a VAT declaration;
- a cancel receivables payables operation operable to cancel a trade or tax receivable or payable;
- a create receivables payables operation operable to create a trade or tax receivable or payable;
- a cancel clearing operation operable to cancel a previously sent clearing request;
- a notify of European community sales list report operation operable to send a European community sales list report;
- a request payment cancellation operation operable to cancel a payment;
- a notify of payment cancellation operation operable to send a notification of a payment or clearing cancellation;
- a request payment information and provisional payment reservation change operation operable to send a request for payment information with a change of provisional reservation of money;
- a request payment operation operable to send a request for payment;
- a notify of trade receivables payables account statement operation operable to send a notification of receivables and payables on a business partners account;
- a confirm clearing operation operable to send a confirmation for a clearing request;
- a request payment information and provisional payment reservation operation operable to send a request for payment information with a provisional reservation of money;
- a query liquidity information operation operable to obtain liquidity information;
- a notify of withholding tax declaration operation operable to send a withholding tax declaration;
- a create clearing operation operable to create a clearing for business partner initiated payments;
- a notify of dunning operation operable to send a notification of outstanding payments;
- a notify of provisional payment reservation change cancellation operation operable to register the change of a provisional payment to the last transactional or saved state;
- a change payment based on payment request confirmation operation operable to confirm the execution of a payment request or a payment request cancellation;
- a notify of payment operation operable to send a notification about payments or clearings of trade and tax receivables or payables;
- a cancel foreign receivable payable operation operable to send a cancellation of a foreign receivable or payable; and a create foreign receivable payable operation operable to create a foreign receivable or payable.

11. The product of claim 10, wherein the service operations further comprise:
a confirm bill of exchange cashing acceptance operation operable to accept a bill of exchange cashing;
an issue bill of exchange operation operable to send a request for the issuing of a bill of exchange;
a request clearing cancellation operation operable to cancel a previously sent clearing request;
a create incoming check operation operable to create incoming checks;
a request check deposit operation operable to send a request for the deposit of a collection of incoming checks;
a request clearing operation operable to send a request for the clearing of payments;
an issue check operation operable to send a request for the issuing of a check;
a create bill of exchange cashing operation operable to create a bill of exchange cashing;
a confirm payment request operation operable to confirm the execution of a payment in response to a payment request;
a notify of payment operation operable to send a notification of cash receipts and cash disbursements;
a request bill of exchange deposit operation operable to send a request for the deposit of a collection of bills of exchange receivables;
a notify of payment cancellation operation operable to send a notification of the cancellation of cash receipts and cash disbursements;
a create payment order operation operable to create a request for payment;
a create payment advice operation operable to create a payment advice;
a change clearing house payment order based on settlement confirmation operation operable to update the status of a clearing house payment order;
a create bank statement operation operable to create a bank statement;
a change payment allocation based on clearing request confirmation operation operable to confirm the execution or rejection of a sent clearing request;
a request payment card payment settlement operation operable to send a collection of payment card payments;
a create payment reservation operation operable to check and determine payment data and create a reservation of payment;
a notify of payment operation operable to send data that allows the assignment of payments to receivables or payables;
a request file based payment order operation operable to instruct a house bank via file to make a bank transfer or a direct debit;
a change payment reservation operation operable to change a reservation of payment;
an issue bill of exchange operation operable to send a request for the issuing of a bill of exchange;
a cancel payment order operation operable to cancel a previously sent payment request by reference;
a synchronous change payment reservation operation operable to change a reservation of payment and confirm the change; and
a query liquidity information operation operable to query liquidity information from relevant process components.

12. The product of claim 10, wherein the computer software comprises:
a plurality of process components, each of the process components being a package of software deployed and executing on the computer system and implementing a respective and distinct business process, the plurality of process components including:
a payment processing process component used to process and manage payments;
a cash management process component used for the analysis and the management of the actual and future flow of money;
an expense and reimbursement management process component used to expense and reimburse;
a dues item processing process component used to manage payables and receivables from service and supply and corresponding sales and withholding; and
a balance of foreign payment management process components used to manage the collection, processing, and reporting of receivables and payables according to foreign trade regulations; and wherein:
the payment processing process component implements the confirm bill of exchange cashing acceptance, the issue bill of exchange, the request clearing cancellation, the create incoming check, the request check deposit, the request clearing, the issue check, the create bill of exchange cashing, the confirm payment request, the notify of payment, the request bill of exchange deposit, the notify of payment cancellation, the create payment order, the create payment advice, the change clearing house payment order based on settlement confirmation, the create bank statement, the change payment allocation based on clearing request confirmation, the request payment card payment settlement, the create payment reservation, the notify of payment, the request file based payment order, the change payment reservation, the issue bill of exchange, the cancel payment order, and the synchronous change payment reservation service operations;
the cash management process component implements the query liquidity information service operation;
the expense and reimbursement management process component implements the notify of project expense, the notify of settlement result cancellation, and the notify of settlement result service operations;
the due item processing process component implements the notify of product tax declaration, the cancel receivables payables, the create receivables payables, the cancel clearing, the notify of European community sales list report, the request payment cancellation, the notify of payment cancellation, the request payment information and provisional payment reservation change, the request payment, the notify of trade receivables payables account statement, the confirm clearing, the request payment information and provisional payment reservation, the query liquidity information, the notify of withholding tax declaration, the create clearing, the notify of dunning, the notify of provisional payment reservation change cancellation, the change payment based on payment request confirmation, and the notify of payment service operations; and
the balance of foreign payment management process component implements the cancel foreign receivable payable and the create foreign receivable payable service operations.

13. The product of claim 12, wherein the computer software comprises:

a plurality of deployment units, each of the deployment units being a package of software packaged together to be deployed on a single physical hardware platform, the plurality of deployment units including:
- a payment deployment unit that includes a bill of exchange cashing, a payment order, a payment advice, a cash storage, a house bank statement, a clearing house payment order, a payment allocation, a payment media run, a check storage, a bill of exchange deposit, an outgoing check, a bank payment order, a payment register, an incoming check, a check deposit, a payment media deposit creation run, a bill of exchange receivable, a bill of exchange payable, a bill of exchange storage, a cash payment, a bill of exchange risk adjustment run, a company payment file register, a house bank account, a payment card payment settlement run, a cash transfer, a liquidity forecast, a liquidity forecast creation run, and an expected liquidity item business objects;
- an expense and reimbursement management deployment unit that includes an expense report and an expense arrangement business objects; and
- a due item management deployment unit that includes a debt guarantee, a due payment run, a due payment, a product tax declaration, a tax due payment, a tax receivables payables register, a European community sales list report, a due clearing, a trade receivables payables account statement, a dunning run, a dunning, a trade receivables payables account statement creation run, a tax declaration run, a withholding tax declaration, a trade receivables payables account, a trade receivables payables register, a pro rata VAT adjustment, a foreign receivables payables report, a foreign receivable payable, and a balance of foreign payment report business objects; and wherein:

the bill of exchange cashing business object represents a cashing of bills of exchange payable at a house bank for debit from a house bank account, the payment order business object represents an order within a company to make a payment to a business partner at a specified time, the payment advice business object represents an announcement of a payment transaction by a business partner to the company, the cash storage business object represents a company's storage for cash of a currency, the house bank statement business object represents a legally binding notification from the house bank about the revenues within a specific time period at a house bank account with a defined starting and closing balance, the clearing house payment order business object represents an order to a clearing house for card payments to settle an incoming card payment using a clearing house account, the payment allocation business object represents an assignment of a payment item, the payment media run business object represents an automated run that creates payment media for bank transfers, debit memos, checks, and bills of exchange, the check storage business object represents a location for incoming checks that a company receives from its business partners, the bill of exchange deposit business object represents a deposit of bills of exchange receivable at a house bank for credit to a house bank account, the outgoing check business object represents a check issued by a company payable to a business partner, the bank payment order business object represents an order to a house bank to make a transfer or direct debit from a specified house bank account, a payment register business object represents the register of incoming and outgoing payments, the incoming check business object represents a check issued by a business partner payable to the company, the check deposit business object represents a deposit of checks at a house bank, the payment media deposit creation run business object represents an automated run that creates payment media deposits to be submitted to a house bank, the bill of exchange receivable business object represents a bill of exchange issued either by the company or by a business partner for the benefit of the company, the bill of exchange payable business object represents a bill of exchange for an outgoing payment, the bill of exchange storage business object represents a location for bills of exchange receivable, the cash payment business object represents an inflow or outflow of cash, a bill of exchange risk adjustment run business object represents an automatic adjustment of the risk due to discounted bills of exchange receivable, the company payment file register business object represents a register for payment files that are exchanged with house banks, the house bank account business object is an internal representation of a company's bank account at a house bank, the payment card payment settlement run business object represents an automated run that creates settlement requests for clearing house payment orders, the cash transfer business object represents a company-internal money transfer, the liquidity forecast business object represents a preview of the medium to long-term development of the liquidity situation of a company or group of companies, the liquidity forecast creation run business object represents an automated run that creates a liquidity forecast, and the expected liquidity item business object represents an expected amount that increases or reduces the liquidity of a company;

the expense report business object represents a list of receipts for the expenses incurred within a certain period of time that are to be reimbursed to an expense reporter and the expense arrangement business object defines parameters for an employee that are needed for expense reports; and the debt guarantee business object represents contingent liabilities and demands from endorsements, payment warranties, and other guarantees, the due payment run business object represents an automated run that creates payment requests based on due trade receivables and payables, the due payment business object represents a payment request or payment confirmation, the product tax declaration business object represents a declaration of the product tax payables/receivables of a company to the responsible tax authority, the tax due payment business object represents a payment request or payment confirmation with regard to tax payables or receivables, the tax receivables payables register business object represents a register of tax receivables and payables of a company, the European community sales list report declares the statistical VAT tax payables/receivables of a European Union member state company to a tax authority, the due clearing business object represents a group of receivables and payables for clearing, the trade receivables payables account statement business object is a list of the increases or decreases to trade receivables or payables of a company from or to a business partner within a certain time period, the dunning run business object represents an automated run that creates dunning proposals, the dunning business object represents a reminder or demand from a company to a business partner to make a payment by a certain point in time, the trade receivables payables account statement creation run represents an automated run that creates account statements for trade receivables and payables based on trade receivables and payables accounts, the tax declaration run business object represents an automated run that creates tax declarations, the withholding tax declaration business object represents a declaration of withholding tax payables of a company to a tax authority, the trade receivables payables account business object represents an account of all trade receivables and payables of a company from or to a business partner, the trade receivables payables register represents a register of the trade receivables and payables of a company from or to its business partners, the pro rata VAT adjustment business object represents an adjustment of tax receivables/payables to account for the difference between the provisional and the definitive pro-rata VAT coefficient, the foreign receivables payables report represents a report to the central bank about trade receivables from and payables to non-residents according to foreign trade regulations, the foreign receivables payable business object represents a receivable from or payable to a non-resident business partner, and the balance of foreign payment report business object represents a report to a central bank about foreign payments.

14. The product of claim 12, wherein:
each of the plurality of process components is assigned to no more than one deployment unit among multiple deployment units, and each deployment unit is deployable on the separate computer hardware platform independent of every other deployment unit; and
all interaction between the process component in one deployment unit and any other process component in any other deployment unit takes place through the respective service operations of the two process components.

15. The product of claim 14, wherein the deployment units comprise:
a payment deployment unit that includes the payment processing and cash management process components;
an expense and reimbursement management deployment unit that includes the expense and reimbursement management process component; and
a due item management deployment unit that includes the due item processing and the balance of foreign payment management process components.

16. The product of claim 14, wherein the deployment units comprise:
a payment deployment unit that implements the confirm bill of exchange cashing acceptance, the issue bill of exchange, the request clearing cancellation, the create incoming check, the request check deposit, the request clearing, the issue check, the create bill of exchange cashing, the confirm payment request, the notify of payment, the request bill of exchange deposit, the notify of payment cancellation, the create payment order, the create payment advice, the change clearing house payment order based on settlement confirmation, the create bank statement, the change payment allocation based on clearing request confirmation, the request payment card payment settlement, the create payment reservation, the notify of payment, the request file based payment order, the change payment reservation, the issue bill of exchange, the cancel payment order, the sync change payment reservation, and the query liquidity information service operations;
an expense and reimbursement management deployment unit that implements the notify of project expense, the notify of settlement result cancellation, and the notify of settlement result service operations; and
a due item management deployment unit that implements the notify of product tax declaration, the cancel receivables payables, the create receivables payables, the cancel clearing, the notify of European community sales list report, the request payment cancellation, the notify of payment cancellation, the request payment information and provisional payment reservation change, the request payment, the notify of trade receivables payables account statement, the confirm clearing, the request payment information and provisional payment reservation, the query liquidity information, the notify of withholding tax declaration, the create clearing, the notify of dunning, the notify of provisional payment reservation change cancellation, the change payment based on payment request confirmation, the notify of payment, the cancel foreign receivable payable, and the create foreign receivable payable service operations.

17. The product of claim 14, wherein the deployment units comprise:
a payment deployment unit that implements a bill of exchange cashing, a payment order, a payment advice, a cash storage, a house bank statement, a clearing house payment order, a payment allocation, a payment media run, a check storage, a bill of exchange deposit, an outgoing check, a bank payment order, a payment register, an incoming check, a check deposit, a payment media deposit creation run, a bill of exchange receivable, a bill of exchange payable, a bill of exchange storage, a cash payment, a bill of exchange risk adjustment run, a company payment file register, a house bank account, a payment card payment settlement run, a cash transfer, a liquidity forecast, a liquidity forecast creation run, and an expected liquidity item business objects;
an expense and reimbursement management deployment unit that includes an expense report and an expense arrangement business objects; and
a due item management deployment unit that includes a debt guarantee, a due payment run, a due payment, a product tax declaration, a tax due payment, a tax receivables payables register, a European community sales list report, a due clearing, a trade receivables payables account statement, a dunning run, a dunning, a trade receivables payables account statement creation run, a tax declaration run, a withholding tax declaration, a trade receivables payables account, a trade receivables payables register, a pro rata VAT adjustment, a foreign receivables payables report, a foreign receivable payable, and a balance of foreign payment report business objects; and wherein:
the bill of exchange cashing business object represents a cashing of bills of exchange payable at a house bank for debit from a house bank account, the payment order business object represents an order within a company to make a payment to a business partner at a specified time, the payment advice business object represents an announcement of a payment transaction by a business partner to the company, the cash storage business object represents a company's storage for cash of a currency, the house bank statement business object represents a legally binding notification from the house bank about the revenues within a specific time period, the clearing house payment order business object represents an order to a clearing house for card payments to settle an incoming card payment using a clearing house account, the payment allocation business object represents an assignment of a payment item, the payment media run business object represents an automated run that creates payment media for bank transfers, debit memos, checks, and bills of exchange, the check storage business object represents a location for incoming checks that a company receives from its business partners, the bill of exchange deposit business object represents a deposit of bills of exchange receivable at a house bank for credit to a house bank account, the outgoing check business object represents a check issued by a company payable to a business partner, the bank payment order business object represents an order to a house bank to make a transfer or direct debit from a specified house bank account, a payment register business object represents the register of incoming and outgoing payments, the incoming check business object represents a check issued by a business partner payable to the company, the check deposit business object represents a deposit of checks at a house bank, the payment media deposit creation run business object represents an automated run that creates payment media deposits to be submitted to a house bank, the bill of exchange receivable business object represents a bill of exchange issued either by the company or by a business partner for the benefit of the company, the bill of exchange payable business object represents a bill of exchange for an outgoing payment, the bill of exchange storage business object represents a location for bills of exchange receivable, the cash payment business object represents an inflow or outflow of cash, a bill of exchange risk adjustment run business object represents an automatic adjustment of the risk due to discounted bills of exchange receivable, the company payment file register business object represents a register for payment files that are exchanged with house banks, the house bank account business object is an internal representation of a company's bank account at a house bank, the payment card payment settlement run business object represents an automated run that creates settlement requests for clearing house payment orders, the cash transfer business object represents a company-internal money transfer, the liquidity forecast business object represents a preview of the medium to long-term development of the liquidity situation of a company or group of companies, the liquidity forecast creation run business object represents an automated run that creates a liquidity forecast, and the expected liquidity item business object represents an expected amount that increases or reduces the liquidity of a company;

the expense report business object represents a list of receipts for the expenses incurred within a certain period of time that are to be reimbursed to an expense reporter and the expense arrangement business object defines parameters for an employee that are needed for expense reports; and the debt guarantee business object represents contingent liabilities and demands from endorsements, payment warranties, and other guarantees, the due payment run business object represents an automated run that creates payment requests based on due trade receivables and payables, the due payment business object represents a payment request or payment confirmation, the product tax declaration business object represents a declaration of the product tax payables/receivables of a company to the responsible tax authority, the tax due payment business object represents a payment request or payment confirmation with regard to tax payables or receivables, the tax receivables payables register business object represents a register of tax receivables and payables of a company, the European community sales list report declares the statistical VAT tax payables/receivables of a European union member state company to a tax authority, the due clearing business object represents a group of receivables and payables for clearing, the trade receivables payables account statement business object is a list of the increases or decreases to trade receivables or payables of a company from or to a business partner within a certain time period, the dunning run business object represents an automated run that creates dunning proposals, the dunning business object represents a reminder or demand from a company to a business partner to make a payment by a certain point in time, the trade receivables payables account statement creation run represents an automated run that creates account statements for trade receivables and payables based on trade receivables and payables accounts, the tax declaration run business object represents an automated run that creates tax declarations, the withholding tax declaration business object represents a declaration of withholding tax payables of a company to a tax authority, the trade receivables payables account business object represents an account of all trade receivables and payables of a company from or to a business partner, the trade receivables payables register represents a register of the trade receivables and payables of a company from or to its business partners, the pro rata VAT adjustment business object represents an adjustment of tax receivables/payables to account for the difference between the provisional and the definitive pro-rata VAT coefficient, the foreign receivables payables report represents a report to the central bank about trade receivables from and payables to non-residents according to foreign trade regulations, the foreign receivables payable business object represents a receivable from or payable to a non-resident business partner, and the balance of foreign payment report business object represents a report to a central bank about foreign payments.

18. The product of claim 12, wherein:

the payment processing process component includes a bill of exchange cashing, a payment order, a payment advice, a cash storage, a house bank statement, a clearing house payment order, a payment allocation, a payment media run, a check storage, a bill of exchange deposit, an outgoing check, a bank payment order, a payment register, an incoming check, a check deposit, a payment media deposit creation run, a bill of exchange receivable, a bill of exchange payable, a bill of exchange storage, a cash payment, a bill of exchange risk adjustment run, a company payment file register, a house bank account, a payment card payment settlement run, and a cash transfer business objects;

the cash management process component includes a liquidity forecast, a liquidity forecast creation run, and an expected liquidity item business objects;

the expense and reimbursement management process component includes an expense report and an expense arrangement business objects;

the due item processing process component includes a debt guarantee, a due payment run, a due payment, a product tax declaration, a tax due payment, a tax receivables payables register, a European community sales list report, a due clearing, a trade receivables payables account statement, a dunning run, a dunning, a trade receivables payables account statement creation run, a tax declaration run, a withholding tax declaration, a trade receivables payables account, a trade receivables payables register, and a pro rata VAT adjustment business objects; and the balance of foreign payment management process component includes a foreign receivables payables report, a foreign receivable payable, and a balance of foreign payment report business objects; and wherein:

the bill of exchange cashing business object represents a cashing of bills of exchange payable at a house bank for debit from a house bank account, the payment order business object represents an order within a company to make a payment to a business partner at a specified time, the payment advice business object represents an announcement of a payment transaction by a business partner to the company, the cash storage business object represents a company's storage for cash of a currency, the house bank statement business object represents a legally binding notification from the house bank about the revenues within a specific time period at a house bank account with a defined starting and closing balance, the clearing house payment order business object represents an order to a clearing house for card payments to settle an incoming card payment using a clearing house account, the payment allocation business object represents an assignment of a payment item, the payment media run business object represents an automated run that creates payment media for bank transfers, debit memos, checks, and bills of exchange, the check storage business object represents a location for incoming checks that a company receives from its business partners, the bill of exchange deposit business object represents a deposit of bills of exchange receivable at a house bank for credit to a house bank account, the outgoing check business object represents a check issued by a company payable to a business partner, the bank payment order business object represents an order to a house bank to make a transfer or direct debit from a specified house bank account, a payment register business object represents the register of incoming and outgoing payments, the incoming check business object represents a check issued by a business partner payable to the company, the check deposit business object represents a deposit of checks at a house bank, the payment media deposit creation run business object represents an automated run that creates payment media deposits to be submitted to a house bank, the bill of exchange receivable business object represents a bill of exchange issued either by the company or by a business partner for the benefit of the company, the bill of exchange payable business object represents a bill of exchange for an outgoing payment, the bill of exchange storage business object represents a location for bills of exchange receivable, the cash payment business object represents an inflow or outflow of cash, a bill of exchange risk adjustment run business object represents an automatic adjustment of the risk due to discounted bills of exchange receivable, the company payment file register business object represents a register for payment files that are exchanged with house banks, the house bank account business object is an internal representation of a company's bank account at a house bank, the payment card payment settlement run business object represents an automated run that creates settlement requests for clearing house payment orders, and the cash transfer business object represents a company-internal money transfer;

the liquidity forecast business object represents a preview of the medium to long-term development of the liquidity situation of a company or group of companies, the liquidity forecast creation run business object represents an automated run that creates a liquidity forecast, and the expected liquidity item business object represents an expected amount that increases or reduces the liquidity of a company;

the expense report business object represents a list of receipts for the expenses incurred within a certain period of time that are to be reimbursed to an expense reporter and the expense arrangement business object defines parameters for an employee that are needed for expense reports;

the debt guarantee business object represents contingent liabilities and demands from endorsements, payment warranties, and other guarantees, the due payment run business object represents an automated run that creates payment requests based on due trade receivables and payables, the due payment business object represents a payment request or payment confirmation, the product tax declaration business object represents a declaration of the product tax payables/receivables of a company to the responsible tax authority, the tax due payment business object represents a payment request or payment confirmation with regard to tax payables or receivables, the tax receivables payables register business object represents a register of tax receivables and payables of a company, the European community sales list report declares the statistical VAT tax payables/receivables of a European Union member state company to a tax authority, the due clearing business object represents a group of receivables and payables for clearing, the trade receivables payables account statement business object is a list of the increases or decreases to trade receivables or payables of a company from or to a business partner within a certain time period, the dunning run business object represents an automated run that creates dunning proposals, the dunning business object represents a reminder or demand from a company to a business partner to make a payment by a certain point in time, the trade receivables payables account statement creation run represents an automated run that creates account statements for trade receivables and payables based on trade receivables and payables accounts, the tax declaration run business object represents an automated run that creates tax declarations, the withholding tax declaration business object represents a declaration of withholding tax payables of a company to a tax authority, the trade receivables payables account business object represents an account of all trade receivables and payables of a company from or to a business partner, the trade receivables payables register represents a register of the trade receivables and payables of a company from or to its business partners, and the pro rata VAT adjustment business object represents an adjustment of tax receivables/payables to account for the difference between the provisional and the definitive pro-rata VAT coefficient; and the foreign receivables payables report business object represents a report to the central bank about trade receivables from and payables to non-residents according to foreign trade regulations, the foreign receivables payable business object represents a receivable from or payable to a non-resident business partner, and the balance of foreign payment report business object represents a report to a central bank about foreign payments.

19. The product of claim 10, wherein:

each of the process components includes one or more business objects; and none of the business objects of any one of the process components interacts directly with any of the business objects included in any of the other process components.

20. The product of claim 19, wherein the business objects comprise a business process object.

21. The product of claim 19, wherein none of the business objects included in any one of the process components is included in any of the other process components.

22. The product of claim 10, further comprising:

a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component;

the inbound process agents comprise a first inbound process agent operable to start the execution of step requested in a first inbound message by creating or updating one or more business object instances; and the outbound process agents comprise a first asynchronous outbound process agent that is called after a business object that is associated with the first outbound process agent changes.

23. A method for providing services from a computer system having payment functionality, the method comprising:

providing services through the sending of messages, the messages including:

a notification about a project expense;

a notification about a cancellation of an expense report;

a notification about a cancellation of settlement results;

a notification about a settlement result;

a notification about a VAT declaration;

a notification cancelling a trade or tax receivable or payable;

a notification creating a trade or tax receivable or payable;

a notification about a canceling a previously sent clearing request;

a notification about a European Community Sales List Report;

a notification cancelling a payment;

a notification about a payment or clearing cancellation;

a notification requesting payment information with a change of provisional reservation of money;

a notification requesting payment;

a notification about receivables and payables on a business partners account;

a notification confirming a clearing request;

a notification requesting payment information with a provisional reservation of money;

a notification about getting liquidity information;

a notification about a withholding tax declaration;

a notification creating a clearing for business partner-initiated payments;

a notification about outstanding payments;

a notification registering the change of a provisional payment to the last transactional or saved state;

a notification confirming the execution of a payment request or a payment request cancellation;

a notification about payments or clearings of trade and tax receivables or payables;

a notification cancelling a foreign receivable or payable; and a notification creating a foreign receivable or payable.

* * * * *